(12) United States Patent
Ushiyama

(10) Patent No.: US 8,099,506 B2
(45) Date of Patent: Jan. 17, 2012

(54) COMMUNICATION SYSTEM, NODE DEVICE, NODE PROCESS PROGRAM AND A MESSAGE TRANSMITTING AND RECEIVING METHOD

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 328 days.

(21) Appl. No.: 12/149,560

(22) Filed: May 5, 2008

(65) Prior Publication Data

US 2008/0294785 A1    Nov. 27, 2008

(30) Foreign Application Priority Data

May 23, 2007    (JP) ................... 2007-136520

(51) Int. Cl.
*G06F 15/16* (2006.01)
*G06F 15/177* (2006.01)

(52) U.S. Cl. ........ 709/228; 709/220; 709/227; 709/245; 709/246

(58) Field of Classification Search .......... 709/220, 709/227, 228, 245, 246
See application file for complete search history.

(56) References Cited

U.S. PATENT DOCUMENTS

| | | | |
|---|---|---|---|
| 6,779,035 B1 * | 8/2004 | Gbadegesin | 709/228 |
| 2002/0143855 A1 * | 10/2002 | Traversat et al. | 709/202 |
| 2004/0139228 A1 * | 7/2004 | Takeda et al. | 709/245 |
| 2004/0162871 A1 * | 8/2004 | Pabla et al. | 709/201 |

FOREIGN PATENT DOCUMENTS

JP    A-2006-197400    7/2006

OTHER PUBLICATIONS

Office Action dated May 31, 2011 issued in Japanese Patent Application No. 2007-136520 (with translation).
Ikeshima Shun, Free IP telephone software "Skype", Nikkei Communications, Dec. 15, 2004, vol. 428 pp. 105-111. (with partial translation).

* cited by examiner

*Primary Examiner* — Carl Colin
*Assistant Examiner* — Chau Le
(74) *Attorney, Agent, or Firm* — Oliff & Berridge, PLC

(57) ABSTRACT

A node device in a communication system including plural node devices connected to a network through a relay device including:
- a means for establishing and retaining session with a first node device which cannot accept session start; and
- a means for controlling sending and receipt of a message with respect to another node device where the session is established, wherein the means changes sending source network address information included in the message to network address information of an own node device and transmits the message to an addressed node device, and the means judges whether or not the message is a message to be sent to the first node device except for the first node device, and controls to transmit the message to the first node device in a case where it is a message to be sent to the first node device.

10 Claims, 14 Drawing Sheets

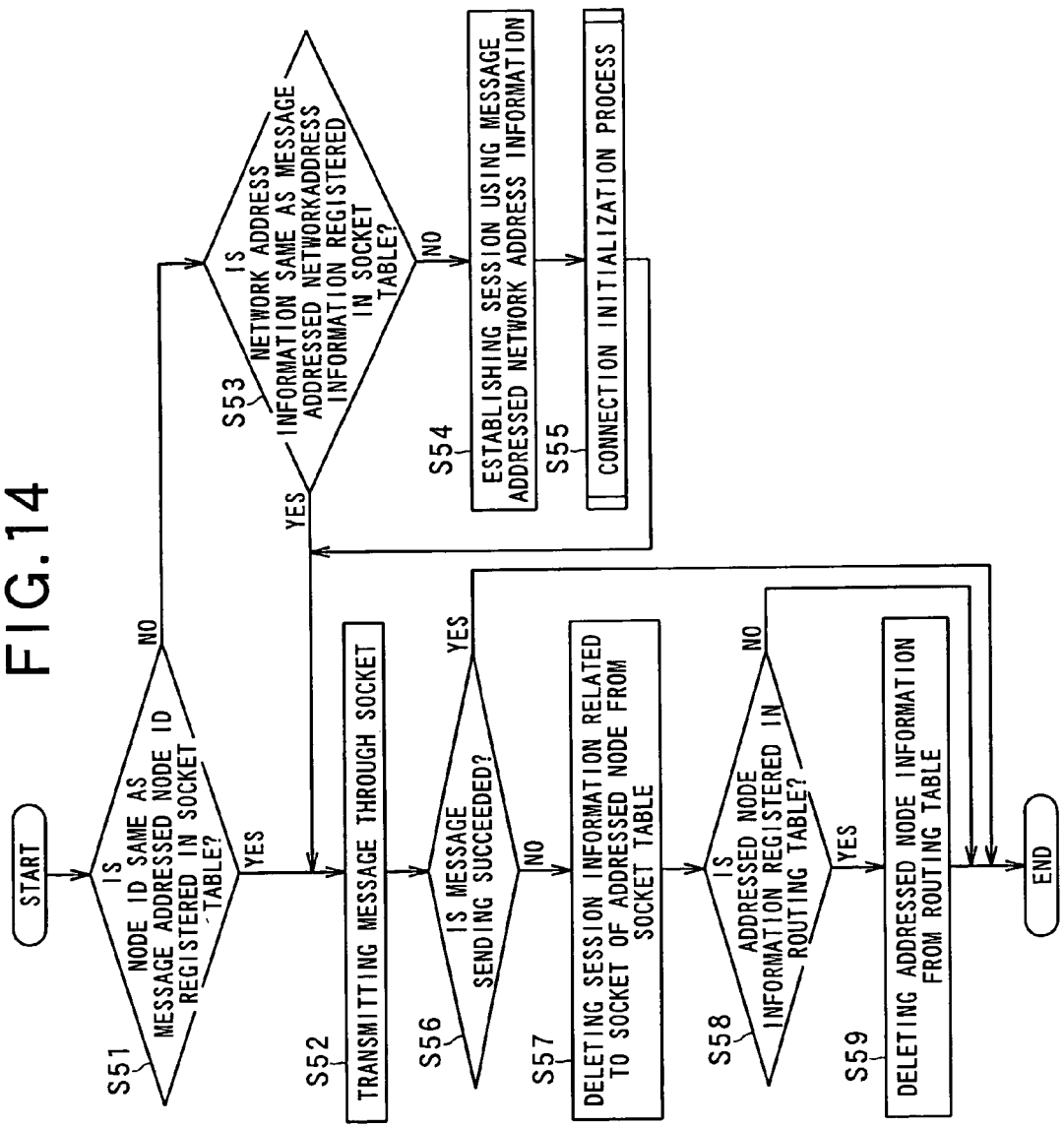

COMMUNICATION SYSTEM, NODE DEVICE, NODE PROCESS PROGRAM AND A MESSAGE TRANSMITTING AND RECEIVING METHOD

The entire disclosures of Japanese Patent Application No. 2007-136520 filed on May 23, 2007 including the specification, claims, drawings and summary are incorporated herein by reference in its entirety.

BACKGROUND OF THE INVENTION

1. Field of the Invention

The present invention relates to a peer to peer (P2P) type communication system including a plurality of node devices mutually communicable through a network.

2. Discussion of the Related Art

As this kind of peer to peer type communication system, a distributed content storing system where content data are distributed and located (distributed storing) into a plurality of node devices is known. By using this system, fault tolerance and property of distributing accesses are enhanced. Location of content data thus distributed and stored can be efficiently searched in use of a distributed hash table (hereinafter referred to as "DHT") as shown in for example in Japanese Unexamined Patent Publication No. 2006-197400. By this nodes devices respectively establish session with a node device storing content data, related to the above-mentioned search, and thereafter enjoy service of the content data from the node device.

These node devices are connected to a network through a router as a rely device and in communication between node devices, for example, TCP (sending Control Protocol)/IP (Internet Protocol) is used. Each of the node devices prepare (open) a port for communication with other node devices. When session (i.e. establish a communication path) is established, a two-way communication through the router and network is enabled.

Meanwhile, NAT (Network Address Translation) is known as an art that node devices without a global IP net address, allocated to it, and with only a private IP address, allocated to it, are connected to the network. In this NAT, an NAT compatible router mutually exchanges a private IP address and a global IP address, and therefore node devices with only private IP address allocated to it can transparently connect to a network.

SUMMARY OF THE INVENTION

However, there is a problem in NAT that it is impossible to directly connect from a network side (i.e. outside of the NAT compatible router) to node devices inside the NAT compatible router. That is, session cannot be started from node devices outside the NAT compatible router to those inside the NAT compatible router. In order to solve the problem, there is known a method where users appropriately set up port forwarding in a NAT compatible router and a method using art of traversing NAT such as "UPnP (Universal Plug and Play)" or "UDP (User Datagram Protocol) hole punching".

However, it is difficult for users without technical knowledge to conduct the above-mentioned setting in NAT compatible router. Further, there is a problem that the arts such as UPnP and UDP hole punching are not succeeded in any and all cases. Furthermore, all NAT compatible routers are not always compatible to UPnP.

For these reasons, there is a possibility of event that for example, in a case where node devices inside the NAT compatible router stores content data, node devices outside the NAT compatible router cannot be provided with content data from the node devices inside the NAT compatible router. Therefore, there is a possibility that advantage of a peer-to-peer type communication system cannot be maximized and operation of the system is disadvantageously affected.

The present invention is made in consideration of the above problems. An object of the present invention is to provide a communication system, a node device, a node process program and a message transmitting and receiving method, wherein users of respective node devices can appropriately receive services provided on the system without affecting operation of the system, even if the communication system includes node devices which cannot accept session start from a network side through a relay device.

To solve the above problem, according to a first aspect of the invention, there is provided a node device in a communication system which includes a plurality of node devices connected to a network through a relay device including:

a session retention means for establishing and retaining session with a first node device which cannot accept session start through the relay device from a side of the network; and a message sending and receiving control means for controlling sending and receipt of a message with respect to another node device where the session is established, wherein the message sending and receiving control means changes sending source network address information included in the message to network address information of an own node device and transmits the message to an addressed node device when it receives the message where the first node device is a sending source and which is addressed to the other node devices except for the own node device, and the message sending and receiving control means judges whether or not the message is a message to be sent to the first node device when it receives a message from a node device except for the first node device as a sending source, and controls to transmit the message to the first node device in a case where it is a message to be sent to the first node device.

According to this invention, in a case where the node device which cannot receive starting of session through the network through the relay device, it is possible to appropriately provide users of the various node devices with service to be provided in the system without avoiding operation of the system. Further the resending source can be utilized while eliminating a wasteful time.

According to the present invention, users of respective node devices can appropriately receive services provided on the system without affecting operation of the system, even if the communication system includes node devices which cannot accept session start from a network side through a relay device. Further, resending sources can be utilized without waste.

BRIEF DESCRIPTION OF THE DRAWINGS

FIG. 14 is a flowchart showing an example of process in a control unit 11 of a node Nn of a modifier example.

DETAILED DESCRIPTION OF THE PREFERRED EMBODIMENTS

Figure 1:
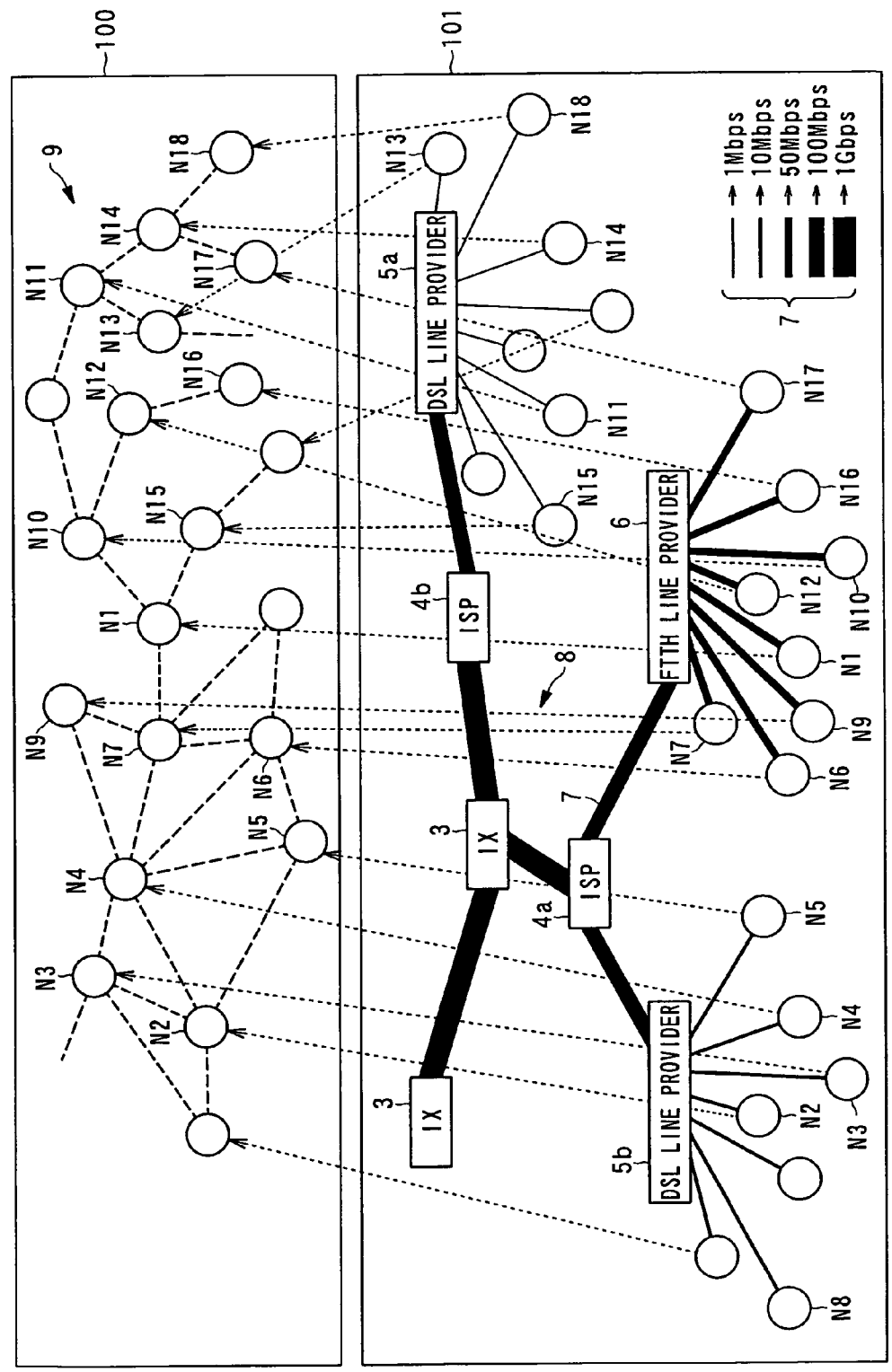
FIG. 1 is a view showing an example of connection status of respective node devices in a distributed content storing system related to the present embodiment.

Hereinafter, each designation of numerical reference in the drawings is typically as follows:
8 Network;
9 Overlay network;
11 Control unit;
12 Memory unit;
13 Buffer memory;
14 Decoder unit;
15 Image processing unit;
16 Display unit;
17 Audio processing unit;
18 Speaker;
19 Communication unit;
20 Input unit;
21 Bus;
Nn Node; and
S Distributed content storing system Hereinafter, an embodiment of the present invention will be described in reference of figures. Here, the embodiment explained below is a case where the present invention is applied to a distributed content storing system.

1. CONFIGURATION AND THE LIKE OF DISTRIBUTED CONTENT STORING SYSTEM

First, with reference to FIG. 1, schematic configuration and the like of a distributed content storing system (an example of communication system) according to the present embodiment will be described.

FIG. 1 is a view showing an example of connection status of respective node devices in a distributed content storing system according to the present embodiment.

As shown in lower frame 101 in FIG. 1, a network (communication network in real world) 8 of the Internet or the like is constructed by an internet exchange (IX) 3, internet service providers (ISP) 4a and 4b, digital subscriber line providers (or device thereof) (DSL) 5a and 5b, fiber to home line provider ('s device) (FTTH) 6, and communication line (e.g. a phone line or an optical cable) 7 and the like.

Here, in the network 8 of the example of FIG. 1, a router for transferring data (packet) (not shown) is appropriately inserted.

In such a network 8, a plurality of node devices (hereinafter referred to as "nodes") Nn (n=any one of 1, 2, 3 . . . ) are connected through a router. A unique manufacturing number and an IP address (private IP address or global IP address) are allocated to each of the nodes Nn. Here, the node Nn having private IP address allocated to it is to be connected to the network 8 through NAT compatible router.

Then, the distributed content storing system S according to the present embodiment is a peer to peer type network system formed by participation of any plurality of nodes Nn of these node Nn, as shown in upper frame 100 of FIG. 1.

Here, a network 9 shown in the upper frame 100 of FIG. 1 is an overlay network 9 (a logical network) including a virtual link formed by use of an existing network 8. Such the overlay network 9 is realized by a specific algorithm, for example, an algorithm using DHT (Distributed Hash Table).

Then, each of the nodes Nn participating in the distributed content storing system S (in other words, the overlay network 9) has a node ID allocated as unique identification information as many as a predetermined number of digits. For example, the node ID is a hashed value obtained by hashing an IP address or manufacturing number (e.g. bit length of 160 bits), individually allocated to each of the nodes Nn by a common hash function (e.g. SHA-1), whereby the nodes are distributed and located in one ID space without deviation.

Participation into the distributed content storing system S is done when a non-participating node Nn (e.g. a node NB) transmits a participation message indicative of a participation request to an arbitrary node Nn already participating in the system (e.g. a contact node always participating in the system S).

Each of the nodes Nn respectively retains a routing table using DHT. The routing table regulates transfer destination of various types of messages on the distributed content storing system S. Specifically a plurality of node information including a node ID and IP address, port number, or the like of other nodes Nn which are appropriately apart in the ID space are registered. Here, a group of IP address and port number constructs network address information.

One node Nn participating in the distributed content storing system S registers in the routing table node information of the minimum and necessary nodes Nn of all the nodes Nn participating in the system S. Delivery to a node Nn having unknown node information (not memorized) is achieved such that various types of messages are transferred respectively between the nodes Nn.

Since such a routing table using DHT is disclosed in Japanese Unexamined Patent Publication No. 2006-197400 and others, detailed explanation is omitted.

Meanwhile, in the distributed content storing system S, various content data (for example, movie and music) (actually, replica of copied content data) are distributed and saved (stored) in a predetermined file format in plural nodes Nn. For example, content data (file) of a movie having a title of XXX is stored in node N5. In node N3, content data (file) of a movie having a title of YYY is stored. In such a manner, content data are distributed and stored in a plurality of nodes Nn (hereinafter referred to as a "content retention node").

Further, to each of these content data, information such as a content name (title) and a content ID (identification information inherent in each content) are added. This content ID is generated by hashing, for example, content name+arbitrary numerical value (or upper some bytes of the content data) by a hash function commonly used to obtain the node ID (allocated in the same ID space as the node ID). Alternatively, a system operator may give a unique ID value (same bit length as a node ID). In this case, content catalog information describing association between a content name and a content ID is distributed to all the nodes Nn.

Further, location of a content data thus distributed and stored, that is, index information including a group of IP address and the like of a node Nn storing the content data and content ID corresponding to the content data is memorized (memorized in index cache) and managed by a node Nn which manages location of the content data (hereinafter referred to as a "root node" or "root node of content (content ID)"). That is, node information of a content retention node storing content data is managed by a root node so as to be provided corresponding to inquiry from other nodes Nn.

For example, index information regarding a content data of a movie having a title of XXX is managed by a node N4, being a root node of the content (content ID) and index information regarding a content data of a movie having a title of YYY is managed by a node N7 being a root node of the content (content ID). Such a root node is set to be a node Nn having a node ID closest to the content ID (e.g. upper digits match the most).

In a case where a user of a node Nn wishes to acquire the desired content data, the node Nn wishing to acquire the content data (hereinafter referred to as "user node") generates a content location inquiry (search) message (query) including a content ID of content data selected (requested) by the user and IP address of the own. The node Nn transmits the message to another node Nn according to a routing table using DHT of the own node. That is, the user node transmits a content location inquiry (search) message to a root node (bound for the root node). Thus the content location inquiry (search) message finally reaches the root node by DHT routing using a content ID as a key.

Here, in each of the node Nn, attribute information such as content name and content ID of the content data selected by a user is described in catalog information distributed to all the nodes Nn from, for example, a content management server. Further, content ID included in the content location inquiry (search) message may be generated by hashing a content name with the common hash function using the user node. With respect to DHT routing, since it is known by Japanese Unexamined Patent Publication No. 2006-197400 and others, detailed explanation is omitted.

The root node which received the above content location inquiry (search) message acquires index information corresponding to the content ID included in this message from an index cache and replies the index information to the user node transmitting the content location inquiry message. Thus, the user node can transmit a content sending request message to the content retention node storing a desired content data and acquire (download) content data.

Alternatively, the root node transmits a content sending request message to a content retention node indicated by the IP address or the like included in the index information. Thus, the user node can receive a content data from, for example, the node N1 being the content retention node.

Here, the user node may acquire the index information from a cache node which caches the index information same as the root node before the content location inquiry message reaches the root node.

The user node thus acquired the content data memorizes and stores the content data in hard disk and the like. The user node generates a publish (registration notification) message including content ID of the content data and own node information and transmits the publish message to a root node (addressed to the root node) to notify to the root node that the content data is stored (in other words, in order to publicize to other nodes Nn participating in the system S). Thus, the publish message reaches the root node by DHT routing using a content ID as a key in a similar manner as a content location inquiry (search) message. The root node registers index information including a group of the node information and the content ID included in the received publish message (memorized in index cache area).

Thus, the user node newly becomes a content retention node retaining the content data.

Here, the index information including a group of node information and content ID included in the publish message is registered (cached) in the cache node on a transfer route to the root node.

In the plurality of node Nn participating in the distributed content storing system S thus configured, there exist nodes which cannot receive session start through a router (NAT compatible router) from a side of network 8, in other words, nodes which cannot acquire ports in an NAT compatible router and cannot NAT-traverse (hereinafter referred to as "NAT untraversal node" (an example of a first node device).

It is impossible to start session from nodes Nn outside the NAT compatible router to such the NAT untraversal node but possible to start session from a side of NAT untraversal node through a NAT compatible router and a network 8 with respect to other nodes Nn. In a case where nodes Nn receiving session start from an NAT untraversal node through a network 8 establish the session, the nodes retain the session (session state).

2. CONFIGURATION, FUNCTION AND THE LIKE OF NODE Nn

Figure 2:
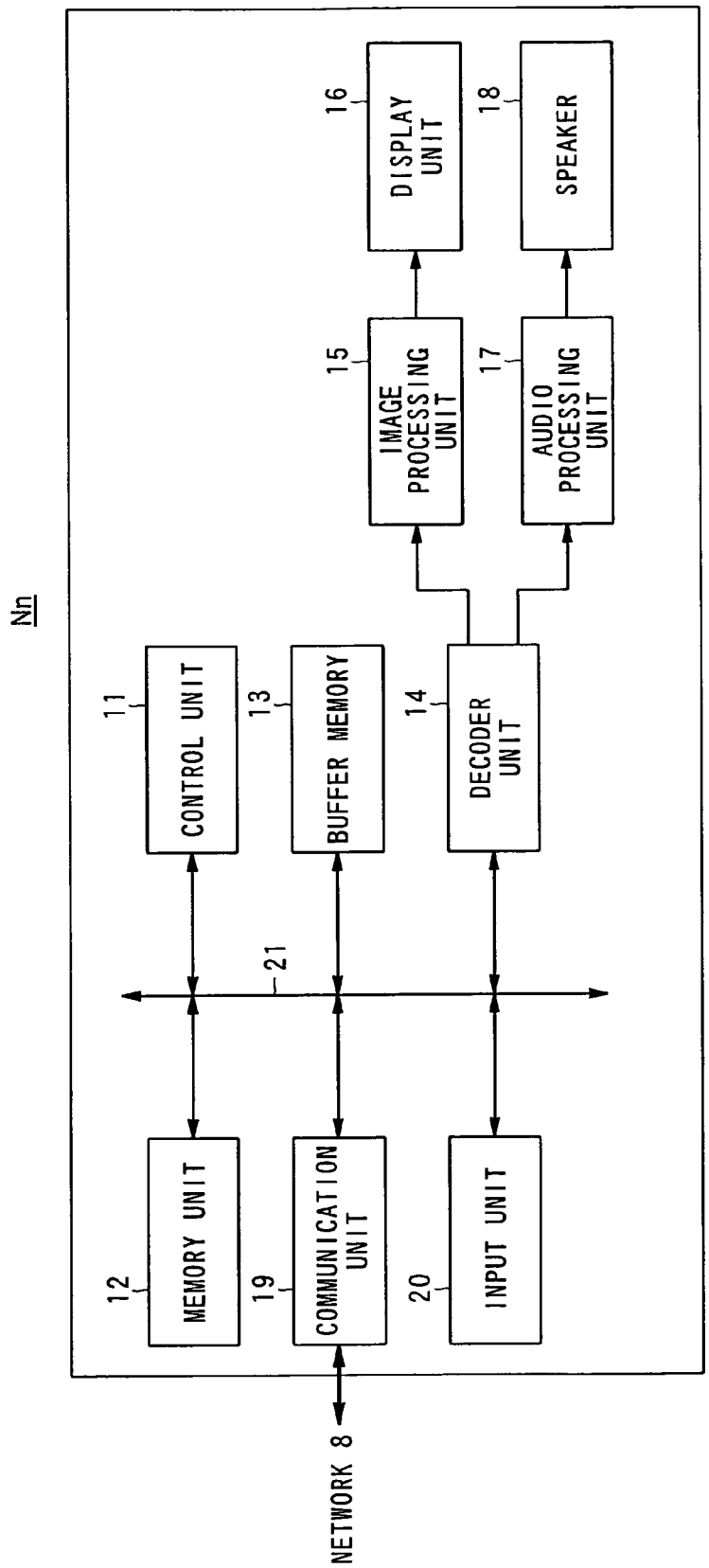
FIG. 2 is a schematic view showing an example of configuration of a node Nn.

Next, with reference to FIG. 2, configuration and function of a node Nn is explained.

FIG. 2 is a view showing a schematic configuration example of a node Nn.

Each of the node Nn is configured by including, as shown in FIG. 2, a control unit 11 being a computer configured by a CPU having computing function, a RAM for work, and a ROM for memorizing various data and programs; a memory unit 12 configured by a hard disk drive or the like for memorizing and saving (storing) various data (e.g. file of content data, content catalog information, index information, DHT), various types of programs and the like; a buffer memory 13 for temporarily storing received content data or the like; a decoder unit 14 for decoding (stretching data) video data (image information) and audio data (voice information) included in content data; an image processing unit 15 for providing a predetermined graphic process to the video data thus decoded or the like and outputting the data as video signal; a display unit 16 such as CRT or liquid crystal display for displaying image based on the video signal outputted from the image processing unit 15, or the like; an audio processing unit 17 for converting the decoded audio data in use of digital/analog (D/A) conversion into an analog audio signal, amplifying the converted signal by an amplifier and outputting the same; a speaker 18 for outputting the audio signal outputted from the audio processing unit 17 as acoustic wave; a communication unit 19 for carrying out communication control of information with respect to other nodes Nn and servers through the network 8; and an input unit 20 (e.g. a keyboard, a mouse, or an operation panel) for receiving instruction signal from a user and providing an instruction signal to the control unit 11 according to the instruction, wherein the control unit 11, the memory unit 12, the buffer memory 13, the decoder unit 14, the communication unit 19, and the input unit 20 are connected each other through a bus 21. Here, a personal computer, a set to box (STB), TV receiver or the like are applicable as the nodes Nn.

In such the configuration, when CPU in the control unit 11 reads out and executes a program in the memory unit 12 or the like, the control unit 11 controls its entirety, functions as a message sending and receiving control means and a session retention means by participating in the distributed content storing system S, and carries out a process as any one of a user node, a cache node, a root node, a cache node, and a content retention node as mentioned above.

Specifically, the control unit 11 controls transmitting and receiving the message with other node Nn where session is established. A once the session is established, the control unit 11 retains the session after receiving or transmitting the message. The session is retained by registering (memorizing) session information. The session information includes, for example, own node information, connection destination node information, socket identifier, and the like.

Here, "socket table" is not a known one but one installed for the present embodiment, and in the socket table, network address information is combined with a node ID.

In the socket table, a plurality of pieces of session information can be registered, thereby retaining session with a plurality of nodes Nn. However, since the number of sockets are limited (e.g. about 30 to 50), in a case where the number of session information exceeds the predetermined number, session information is deleted beginning with session information related to least used socket. In this case, session information related to the NAT untraversal node is left without deletion as much as possible. That is, session information which is related to nodes Nn except for NAT untraversal nodes and related to an unused socket is given priority to delete from the socket table.

Here, an IP address included in node information of NAT untraversal node is an IP address (global IP address) outside the NAT compatible router, and port number included in node information of the NAT untraversal node is a port number outside the NAT compatible router (number of vacant port in the NAT compatible router at the time of session start).

Further, the control unit 11 maintaining session with an NAT untraversal node (node except for NAT untraversal nodes) carries out a process as a relay node of the NAT untraversal node.

Specifically, the relay node table is prepared in the relay node. After session start is accepted from an NAT untraversal node and the session is established, and then when a message being a sending sending source message which is sent from the NAT untraversal node and addressed to a node Nn except for the own node is received, the control unit 11 of the relay node allocates unique relay node identifier (an example of relay information indicative of the NAT untraversal node) to NAT untraversal node. The control unit 11 relates node information of the NAT untraversal node and thus allocated relay node identifier and register them in the relay node table.

Here, thus registered node information of the NAT untraversal node and relay node identifier are deleted from the relay node table, in a case where session with the NAT untraversal node is disconnected. In other words, the session information is deleted.

Then the control unit 11 rewrites the sending sending source node information included in the message (NAT untraversal node) to node information of the own node. That is, the control unit 11 of the relay node changes the sending sending source node information included in the message to node information of the own node. However, the control unit 11 adds the identifier of the relay node identifier registered in the relay node table allocated to the NAT untraversal node to the rewritten node information of the own node and transmits the message to the address of the node Nn.

On the other hand, when a message sent from the node Nn except for the NAT untraversal node as a sending sending source, the control unit 11 of the relay node judges whether or not the message is to be sent to the NAT untraversal node in a state of retaining session with the own node based on for example a relay node identifier added to node information of an address included in the message. In a case where it is a message to be sent to the NAT untraversal node, the control unit 11 controls to transmit the message to the NAT untraversal node. For example, in a case where the relay node identifier added to the node information addressed to by the message is registered in the relay node table, it is judged that the received message is a message to be sent to the NAT untraversal node which is related to the relay node identifier and registered in the relay node table. Upon such judgment, the message addressed node information is rewritten to the node information of NAT untraversal node related to the relay node identifier and registered, and sent.

3. ACTION OF DISTRIBUTED CONTENT STORING SYSTEM S

Next, an action of the distributed content storing system S related to the present embodiment is explained.
(Action Outline)

First, an action is explained with reference to FIG. 3.

Figure 3:
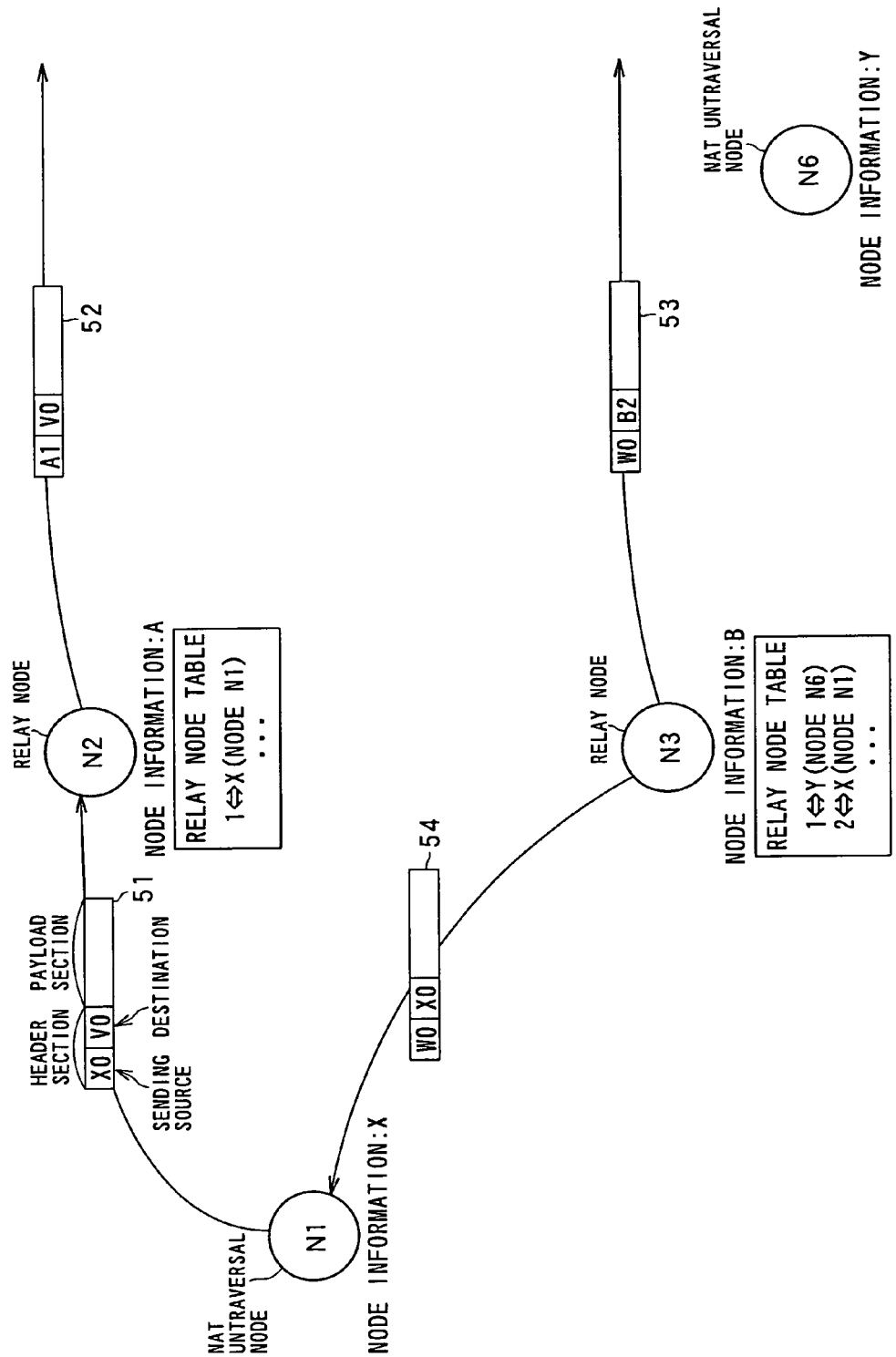
FIG. 3 is a schematic view showing an example of transmitting and receiving messages by an NAT untraversal node and a relay node.

FIG. 3 is a schematic view showing an example of transmitting and receiving a message according to NAT untraversal node and relay node.

Here, in the example of FIG. 3, a node N1 is an NAT untraversal node and has node information "X". A node N2 is a relay node and has node information "A". A node N3 is a relay node and has node information "B". A node N6 is an NAT untraversal node and has node information "Y".

As shown in FIG. 3, node information as a sending sending source of a message 51 sent from a node N1 being an NAT untraversal node is the node information of the node N1. Further, "0" is added to the node information "X" as a relay node identifier (indicative of own). As a destination of the message 51, an arbitrary node Nn except for the node N2 is set up.

When the message 51 is received by the node N2 being a relay node, the node N2 allocates a relay node identifier "1" to the node N1, relates the node information "X" of the node N1 to the relay node identifier "1", and registers them in the relay node table to thereby retain session. Subsequently, the node N2 rewrites the sending source node information "X" in the message 51 to the own node information "A", and adds the relay node identifier "1" instead of the relay node identifier "0" added to the node information "X" (rewriting the relay node identifier from "0" to "1"). A message 52 with its sending sending source node information and the like thus rewritten is sent to the arbitrary node Nn, being the destination.

On the other hand, the node information "Y" of the node N6, being an NAT untraversal node, and the relay node identifier "1" are related, and already registered in the relay node table of the node N3. Further, the node information "X" of the node N1, being an NAT untraversal node, and the relay node identifier "2" are related and registered.

The node N3 receives a message 53 sent from an arbitrary node Nn. Since the relay node identifier added to the node information "B" being a destination of the message 53 is not "0" but "2" though the message 53 is a message addressed to the node N3, it is judged that the message 53 is a message to be sent to the NAT untraversal node. Subsequently, the node N3 rewrites the addressed node information "B" in the message 53 to the node information "X" of the node N1 registered in the relay node table, and adds the relay node identifier "0" instead of the relay node identifier "2" added to the node information "B". Thus, a message 54 rewritten with the addressed node information and the like is sent (relayed) to the node N1 being NAT untraversal node retaining session with the node N3.

(Request of Content Data by NAT Untraversal Node)

Figure 4:
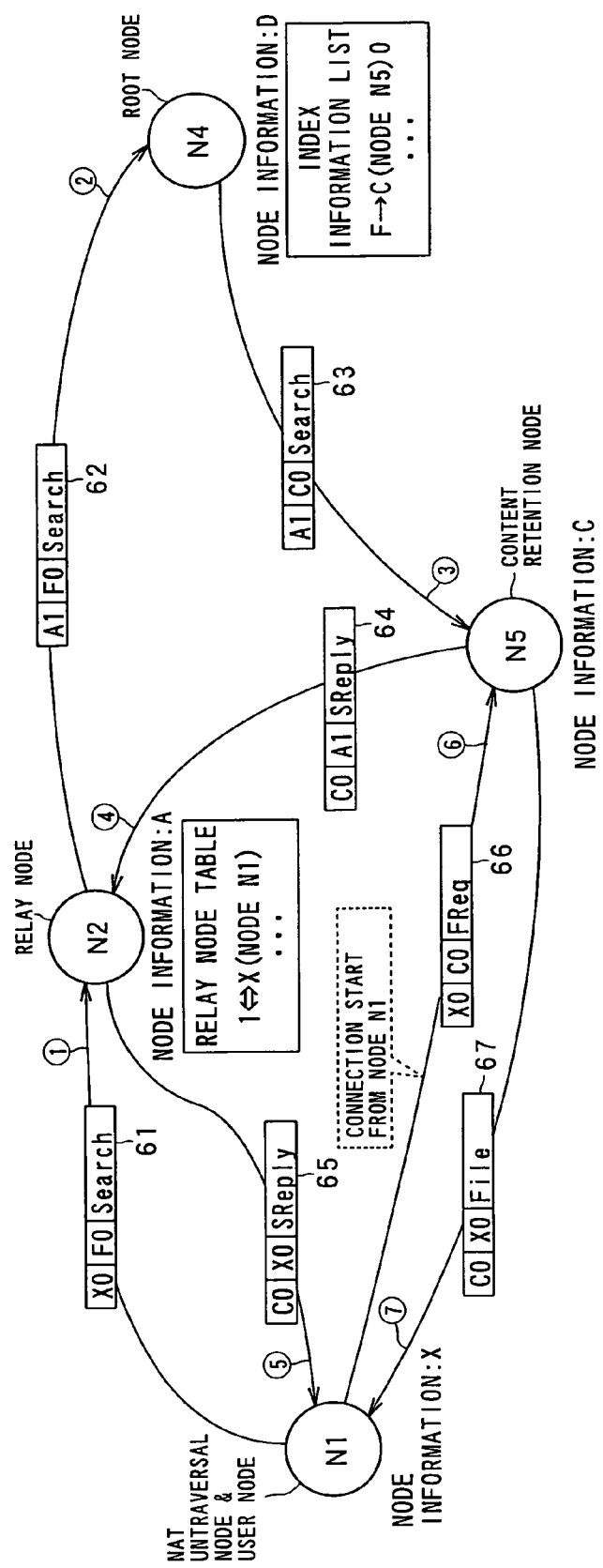
FIG. 4 is a schematic view showing an example of a flow of the message when the NAT untraversal node requests content data.

Next, with reference to FIG. 4, an action when content data are requested by an NAT untraversal node is explained.

FIG. 4 is a schematic view showing an example of a flow of message when content data are requested by an NAT untraversal node. Here, the node information "X" of the node N1 being an NAT untraversal node and the relay node identifier "1" are already related and registered in the relay node table of the node N2.

In a case where the node N1 being an NAT untraversal node requests content data (file) of a content ID "F", the node N1 generates a content location inquiry (search) message (hereinafter referred to as "search message") 61 which makes an addressed node ID a content ID "F". The node N1 transmits the search message 61 to the node N2 retaining session.

Next, when the search message 61 is received by the node N2, the node N2 rewrites the sending sending source node information "X" in the search message 61 to the own node information "A", and adds the relay node identifier "1" instead of the relay node identifier "0" added to the node information "X". Then the node N2 acquires an IP address and port number of for example the node N4 having a node ID closest to the content ID from the own routing table using DHT. Then the node N2 establishes session with the node N4 and transmits a search message 62 rewritten with node information to the node N4.

Next, when the search message 62 is received by the node N4, the node N4 judges that a node Nn having a node ID closest to a content ID included in the search message 62 is own, for example, judges from the own routing table that it is a root node of the content ID "F". The node N4 acquires index information corresponding to the content ID included in the search message 62 from the index cache. Thus a node N5 is identified as a content retention node storing the content data of the content ID "F". Subsequently, the node N4 changes addressed node information in the search message 62 to node information "C" of the node N5. The node N4 establishes session with the node N5 and transmits the search message 63 to the node N5.

Next, when the search message 63 is received by the node N5, if the content data of the content ID "F" are transmittable, the node N5 makes the sending source node information the own "C" (relay node identifier "0") and generates a search response message 64 where the addressed node information and the relay node identifier are made to be the node information "A" and the relay node identifier "1" of the node N2 included in the search message 63. The node N5 establishes session with the node N2 and transmits the search response message 64 to the node N2.

Next, when the search response message 64 is received by the node N2, the node N2 rewrites the addressed node information "A" in the search response message 64 to the node information "X" of the node N1, registered in the relay node table, and adds the relay node identifier "0" instead of the relay node identifier "1", added to the node information "A". Then the node N2 transmits a search response message 65 to the node N1 retaining session.

Next, when the search response message 65 is received by the node N1, the node N1 makes the sending source node information the own "X" (relay node identifier "0") and generates a content transmit request message 66 where addressed node information is node information "C" relay node identifier "0") of the node N5 included in the search response message 65. Then the node N1 starts session with the node N5 to establish it, and transmits the content transmit request message 66 to the node N5. Here, the session between the node N1 and the node N5 is retained, and node information of the node N1 and the relay node identifier are related and registered in the relay node table of the node N5.

Next, when the content transmit request message 66 is received by the node N5, the node N5 makes sending source node information the own "C" (relay node identifier "0") and generates a content transmit message 67 where addressed node information is node information "X" (relay node identifier "0") of the node N1. Then the node N5 stores a packet of content data in a payload section of the content transmit message 67 and transmits the content transmit message 67 to the node N1 (upload of the content data).

(Publication of Content Data by NAT Untraversal Node)

Figure 5:
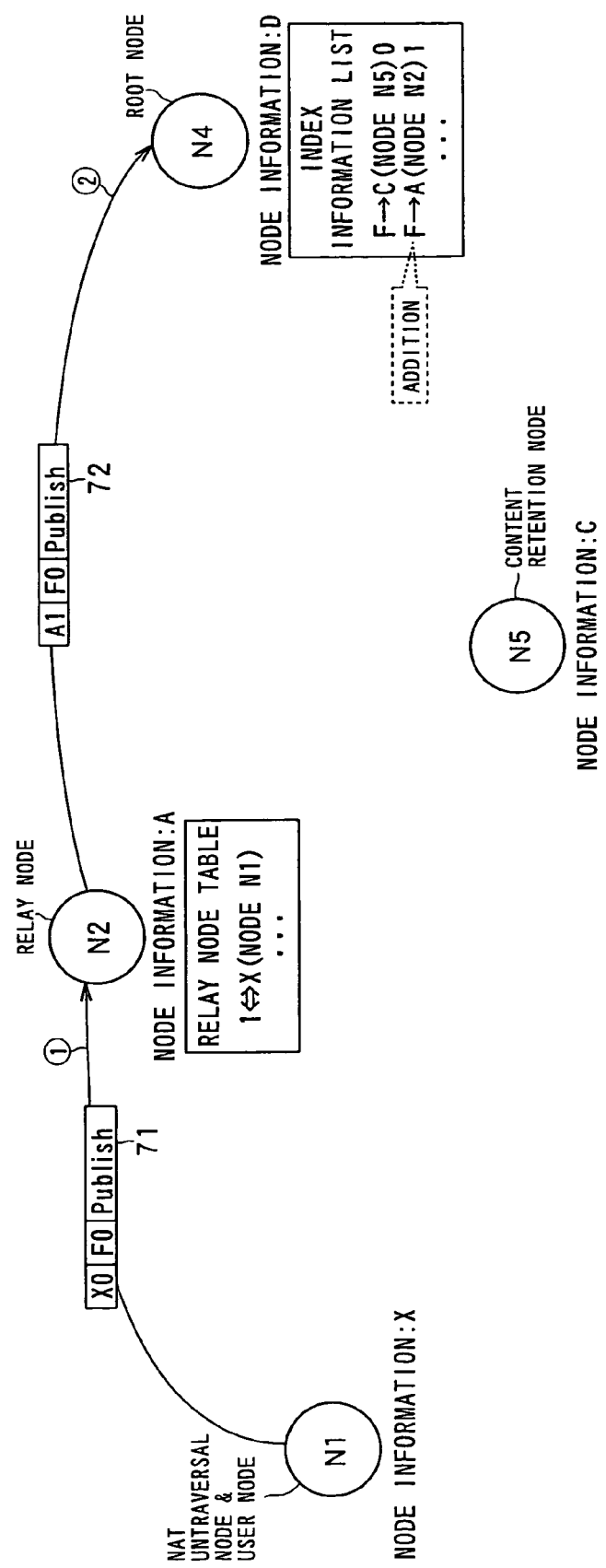
FIG. 5 is a schematic view showing an example of a flow of the message when the NAT untraversal node publishes content data.

Next, with reference to FIG. 5, an action during publication of content data by an NAT untraversal node is explained.

FIG. 5 is a schematic view showing an example of a flow of message when content data is published by an NAR untraversal node. Here, the node information "X" and the relay node identifier "1" of the node N1, being an NAT untraversal node in the relay node table of the node N2, are already related and registered.

As described above, the node N1 being an NAT untraversal node memorizes and stores content data acquired from the node N5 in the memory unit 12, and generates a publish message 71 where an addressed node ID is the content ID "F". Then the node N1 transmits the publish message 71 to the node N2 retaining session.

Next, when the publish message 71 is received by the node N2, the node N2 rewrites the sending sending source node information "X" in the publish message 71 to the own node information "A", and adds the relay node identifier "1" instead of the relay node identifier "0" added to the node information "X". The node N2 acquires IP address and port number of, for example, the node N4 having a node ID closest to the content ID, from the own routing table. The node N2 establishes session with the node N4 and transmits to the node N4 a publish message 72 rewritten with node information.

Next, when the publish message 72 is received by the node N4, the node N4 judges from the routing table that a root node having the node ID closest to the content ID included in the publish message 72 is own. Then the node N4 registers (memorizing in an index cache region) index information including the content ID, the sending sending source node information "A", and the relay node identifier "1" added thereto which are included in the publish message 72.

(Request of Content Data to NAT Untraversal Node)

Figure 6:
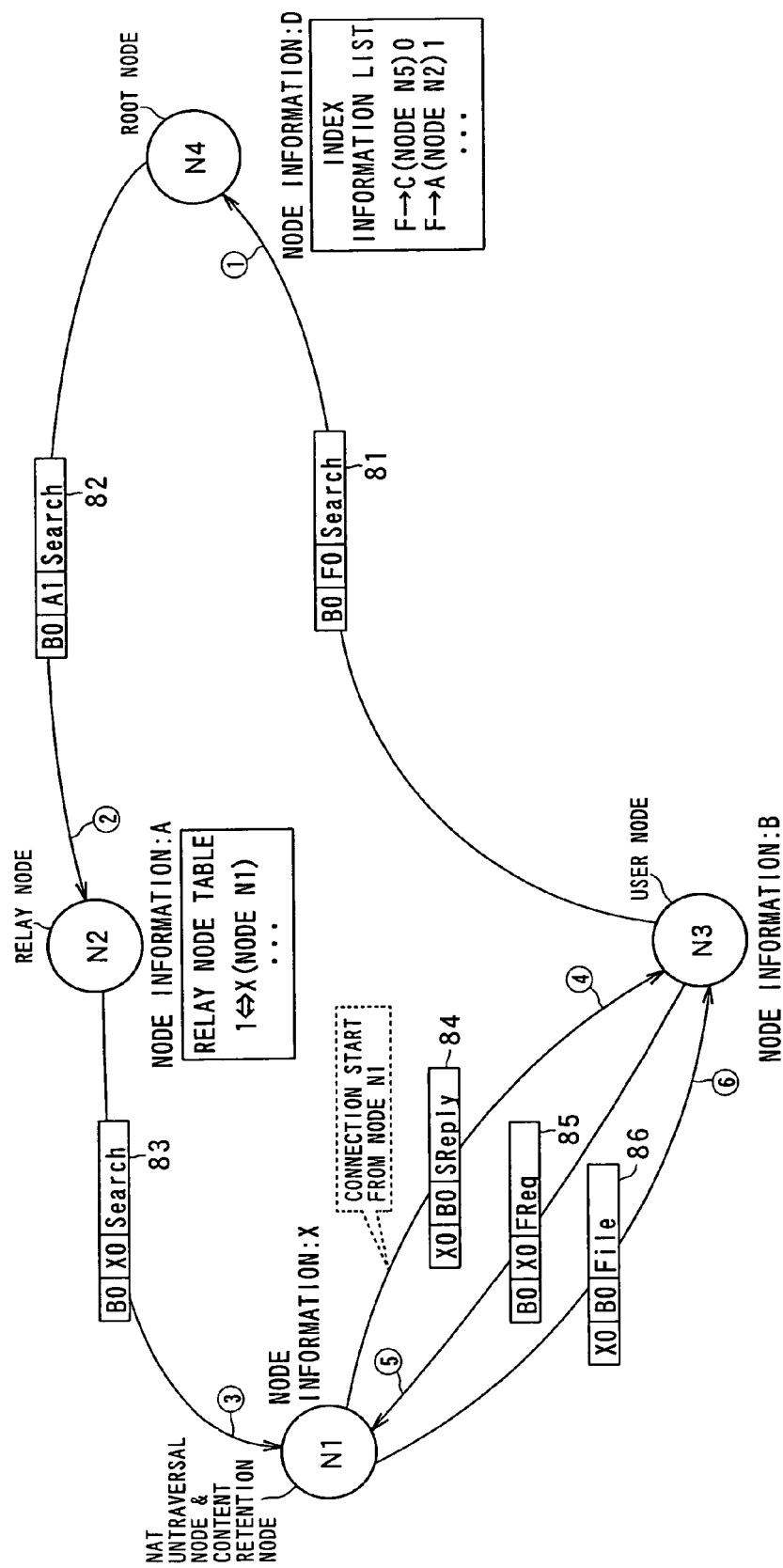
FIG. 6 is a schematic view showing an example of a flow of the message when content data are requested to the NAT untraversal node.

Next, with reference to FIG. 6, an action during request of content data to an NAT untraversal node is described.

FIG. 6 is a schematic view showing an example of a flow of the message when content data are requested to the NAT untraversal node. Here, in the relay node table in the node N2, the node information "X" and the relay node identifier "1" of the node N1, being an NAT untraversal node, are related and registered.

In a case where the node N3 where session with the node N1 being an NAT untraversal node is not established requests content data of a content ID "F", the node N3 generates a search message 81 where the addressed node ID is the content ID "F". The node N3 acquires IP address and port number of, for example, the node N4 having the node ID closest to the content ID from the own routing table. Then the node N3 establishes session with the node N4 and transmits the search message 81 to the node N4.

Next, when the search message 81 is received by the node N4, the node N4 judges that the root node having a node ID closest to the content ID included in the search message 81 is itself from the own routing table. The node N4 acquires from the index cache the index information corresponding to the content ID included in the search message 81. In the example of FIG. 6, node information "C" and a relay node identifier "0" of the node N5 and node information "A" and a relay node identifier "1" of the node N2 are related with a content ID "F" and registered in the index cache. Here "A1" is acquired. Therefore, the node N2 is identified as the content retention node storing content data of content ID "F". However, although the node N2 is registered as a content retention node in the root node, the node N1 actually is the content retention node.

Sequentially, the node N4 rewrites the addressed node information in the search message 81 to the node information "A" of the node N2 thus identified and adds "1" instead of the relay node identifier "0". Then the node N4 establishes session with the node N2 and transmits a search message 82 to the node N2.

Next, when the search message 82 is received by the node N2, the node N2 rewrites the addressed node information "A" in the search message 82 to the node information "X" of the node N1 registered in the relay node table, and adds the relay node identifier "0" instead of the relay node identifier "1" added to the node information "A". Then the node N2 transmits a search message 83 to the node N1 retained in the session. That is, actually the node N2 transfers the search message 83 to the content retention node.

Next, when the search message 83 is received by the node N1, the node N1 makes sending source node information its own "X" (relay node identifier "0") and generates a search response message 84 where addressed node information is node information "B" (relay node identifier "0") of the node N3 included in the search message 83. Then the node N1 starts and establishes session with the node N3, and transmits the search response message 84 to the node N3. Here, the session between the node N1 and the node N3 is retained, and node information and a relay node identifier of the node N1 are related and registered in the relay node table of the node N3.

Next, when the search response message 84 is received by the node N3, the node N3 makes sending source node information its own "B" (relay node identifier "0") and generates a content transmit request message 85 where addressed node information is node information "X" (relay node identifier "0") of the node N1. Then the node N3 transmits the content transmit request message 85 to the node N1.

Next, when the content transmit request message 85 is received by the node N1, the node N1 makes sending source node information its own "X" (relay node identifier "0") and generates a content transmit message 86 where addressed node information is node information "B" (relay node identifier "0") of the node N3. Then the node N1 stores a packet of content data in a payload section of the content transmit message 86 and transmits the content transmit message 86 to the node N3 (upload of content data).

(Request of Content Data from one NAT Untraversal Node to Another NAT Untraversal Node)

Next, with reference to FIG. 7, an action of content data during request of content data from one NAT untraversal node to other NAT untraversal node will be explained.

Figure 7:
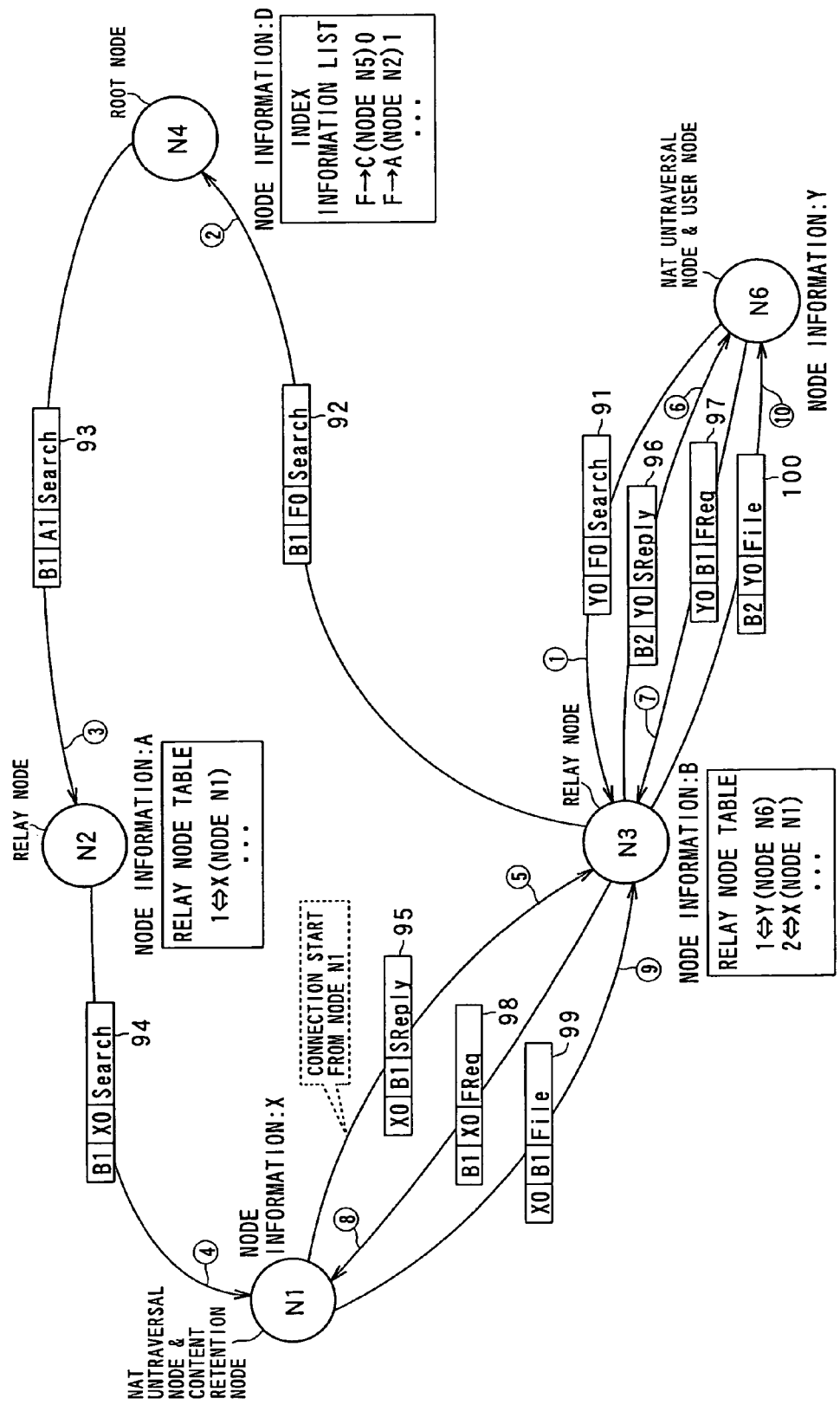
FIG. 7 is a schematic view showing an example of a flow of the message when content data are requested from one NAT untraversal node to another NAT untraversal node.

FIG. 7 is a schematic view showing an example of a flow of a message when content data is requested from an NAT untraversal node to another NAT untraversal node. Here, in the relay node table in the node N3, the relay node identifier "1" and the node information "Y" of the node N6 being an NAT untraversal node are related and registered. Further, the relay node identifier "1" and the node information "X" of the node N1 being another NAT untraversal node are already related and registered in the relay node table in the node N2.

In a case where the node N6 being an NAT untraversal node requests content data of the content ID "F", the node N6 generates a search message 91 where an addressed node ID is the content ID "F". Then the node N6 transmits the search message 91 to the node N3 where session is retained.

Next, when the search message 91 is received by the node N3, the node N3 rewrites the sending source node information "Y" in the search message 91 to the own node information "B", and adds the relay node identifier "1" instead of the relay node identifier "0" added to the node information "Y". Then the node N3 acquires an IP address and port number of, for example, a node N4 having a node ID closest to the content ID from the own routing table using DHT. Then the node N3 establishes session with the node N4 and transmits a search message 92 to the node N4.

Next, when the search message 92 is received by the node N4, the node N4 judges that a root node having a node ID closest to the content ID included in the search message 92 is itself from the own routing table. Then, the node N4 acquires index information corresponding to the content ID included in the search message 92 from the index cache. Here, A1 is acquired in a manner similar to the example of FIG. 6. Thus the node N2 is identified as a content retention node storing content data of the content ID "F".

Subsequently, the node N4 rewrites the addressed node information in the search message 92 to node information "A" of the node N2 thus identified and adds "1" instead of the relay node identifier "0". The node N4 establishes session with the node N2 and transmits a search message 93 to the node N2.

Next, when the search message 93 is received by the node N2, the node N2 rewrites the addressed node information "A" in the search message 93 to the node information "X" of the node N1 registered in the relay node table and adds the relay node identifier "0" instead of the relay node identifier "1", added to the node information "A". Then, the node N2 transmits a search message 94 to the node N1 retaining session.

Next, when the search message 94 is received by the node N1, the node N1 makes sending source node information its own "X" (relay node identifier "0") and generates a search response message 95 where addressed node information is node information "B" (relay node identifier "1") of the node N3 included in the search message 94. Then the node N1 starts and establishes session with the node N3 and transmits a search response message 95 to the node N3.

Next, when the search response message 95 is received by the node N3, the node N3 assigns a relay node identifier "2" which is not duplicated with the node N6 to the node N1, relates the relay node identifier "2" and the node information "X" of the node N1, registers them in the relay node table, and retain session. Next, the node N3 rewrites the sending source node information "B" in the search response message 95 to the node information "Y" of the node N6 registered in the relay node table and adds the relay node identifier "0" instead of the relay node identifier "1" added to the node information "B". Further, the node N3 rewrites the sending source node information "X" in the search response message 95 to the node information "B" of its own, and adds the relay node identifier "2" instead of the relay node identifier "0" added to the node information "X". Then the node N3 transmits a search response message 96 to the node N6 retaining session.

Next, when the search response message 96 is received by the node N6, the node N6 makes the sending source node information its own "Y" (relay node identifier "0") and generates a content transmit request message 97 where addressed node information is node information "B" (relay node identifier "2") of the node N3 included in the search response message 96. Then the node N6 transmits a content transmit request message 97 to the node N3.

Next, when the content transmit request message 97 is received by the node N3, the node N3 rewrites the sending source node information "Y" in the content transmit request message 97 to the own node information "B", and adds the relay node identifier "1" instead of the relay node identifier "0" added to the node information "Y". Further, the node N3 rewrites the addressed node information "B" in the content transmit request message 97 to the node information "X" of the node N1 registered in the relay node table, and adds the relay node identifier "0" instead of the relay node identifier "2" added to the node information "B". Then, the node N3 transmits a content transmit request message 98 to the node N1 retaining session.

Next, when the content transmit request message 98 is received by the node N1, the node N1 makes the sending source node information its own "X" (relay node identifier "0") and generates a content transmit message 99 where addressed node information is node information "B" (relay node identifier "1") of the node N3. Then the node N1 stores a packet of content data in a payload section of the content transmit message 99 and transmits the content transmit message 99 to the node N3.

Next, when the content transmit message 99 is received by the node N3, the node N3 rewrites the addressed node information "B" in the content transmit message 99 to the node information "Y" of the node N6 registered in the relay node table, and adds the relay node identifier "0" instead of the relay node identifier "1" added to the node information "B". Further, the node N3 rewrites the sending source node information "X" in the content transmit message 99 to the information "B" of its own, and adds the relay node identifier "2" instead of the relay node identifier "0" added to the node information "X". Then, the node N3 transmits a content transmit message 100 to the node N6 retaining session (upload of the content data).

(Process of Node Nn)

Next, with respect to an arbitrary node Nn, a process of a control unit 11 of the node Nn is described with reference to FIGS. 8 to 10.

Figure 8:
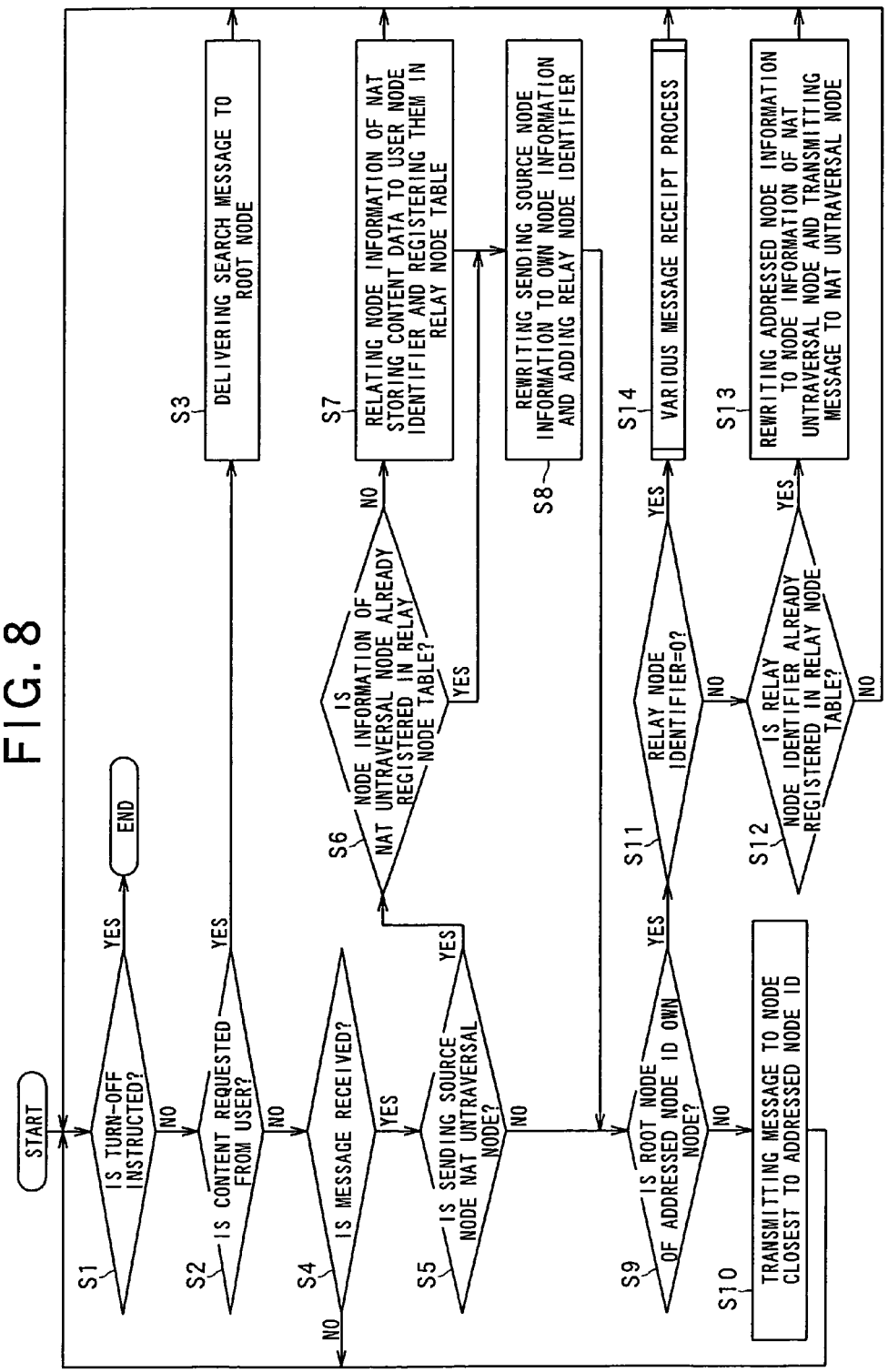
FIG. 8 is a flowchart showing an example of process in a control unit 11 of an arbitrary node Nn.
Figure 9:
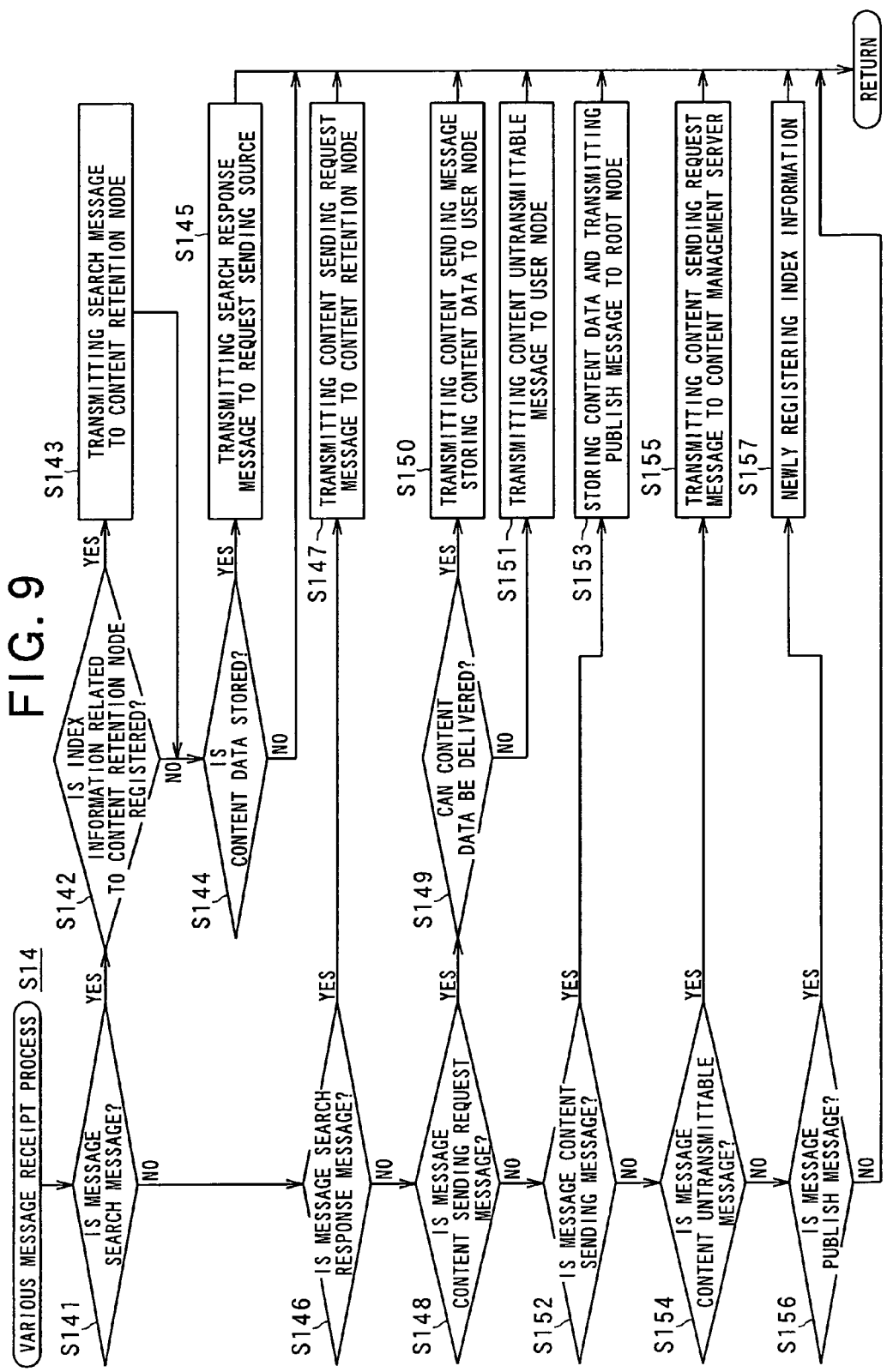
FIG. 9 is a flowchart showing an example of process in a control unit 11 of an arbitrary node Nn.
Figure 10:
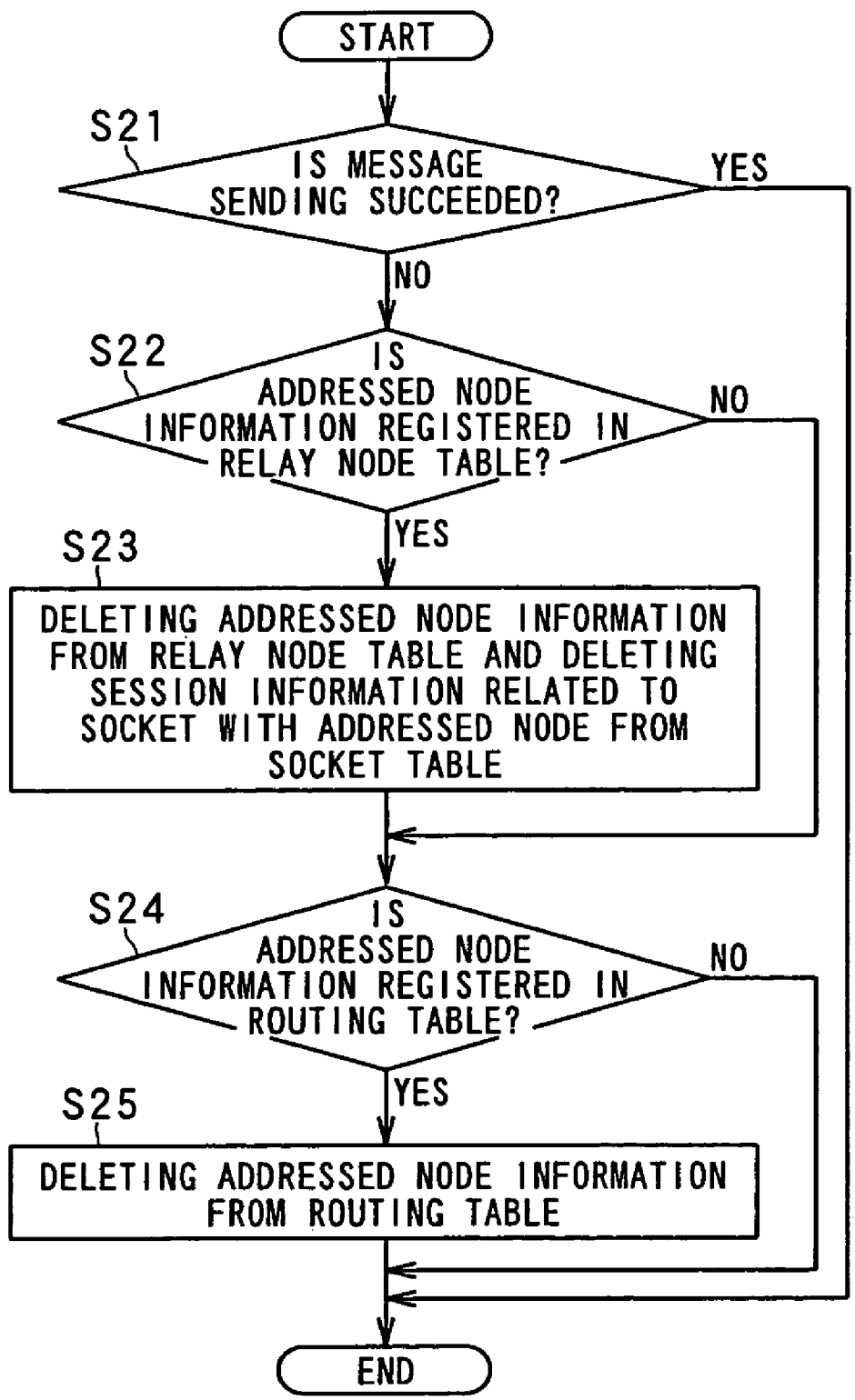
FIG. 10 is a flowchart showing an example of process in a control unit 11 of an arbitrary node Nn.

FIGS. 8 to 10 are flowcharts showing an example of process of the control unit 11 of an arbitrary node Nn.

A process shown in FIG. 8 starts for example in a turned-on state in arbitrary node Nn and participation in the distributed content storing system S is carried out.

In Step S1, the control unit 11 judges whether or not turn-off is instructed, and in a case where turn-off is instructed (Step S1: YES), the process is finished. In a case where turn-off is not instructed (Step S1: NO), the process goes to Step S2.

In Step S2, the control unit 11 judges whether or not content data are requested from a user through an input unit 20, and in a case where content data are requested (Step S2: YES), the process goes to Step S3. In a case where content data are not requested (Step S2: NO), the process goes to Step S4.

In Step S3, the control unit 11 delivers a search message including a content ID of the requested content data to a root node.

In Step S4, the control unit 11 judges whether or not the message is received from the other node Nn, and in a case where the message is received (Step S4: YES), the process goes to Step S5. In a case where the message is not received (Step S4: NO), the process goes to Step S.

In Step S5, the control unit 11 judges whether or not a sending source node Nn of the received message is an NAT untraversal node, for example based on the port number included in the sending source node information included in the message. For example, in a case where the port number is invalid (e.g. "00000"), it is judged that the sending source node Nn of the message is an NAT untraversal node because it is judged that the port cannot be acquired in an NAT compatible router (Step S5: YES). Then the process goes to Step S6. In a case where it is not judged as an NAT untraversal node (Step S5: NO), the process goes to Step S9.

In Step S6, the control unit 11 judges whether or not node information of the sending source NAT untraversal node is registered in a relay node table. In a case where it is not registered (Step S6: NO), the process goes to Step S7. In a case where it is registered (Step S6: YES), the process goes to Step S8.

In Step S7, the control unit 11 assigns a relay node identifier to the NAT untraversal node, relates node information of the NAT untraversal node to thus allocated relay node identifier, and registers them in a relay node table. Session information including the node information of NAT untraversal node is registered in a socket table, and the session is retained.

In Step S8, the control unit 11 rewrites the node information of the NAT untraversal node in thus received message to the node information of the own node and adds the relay node identifier as mentioned above according to the relay node table. Then the process goes to Step S9.

In Step S9, the control unit 11 judges from the own routing table whether or not a root node of the node ID (or content ID) included in the addressed node information of received message is the own node. In other words, it is judged whether or not a node Nn having a node ID closest to the node ID (or content ID) is the own node. In a case where the root node is not the own node (Step S9: NO), the control unit 11 identifies the node Nn closest to the node ID (or content ID) included in the addressed node information of the message from the own routing table, and transmits (transfers) thus received message to thus identified node Nn (Step S10), and the process returns to Step S1.

On the other hand, in a case where the root node is the own node (Step S9: YES), the control unit 11 judges whether or not the relay node identifier that is made unavailable by the addressed node information of the message is "0" (Step S11). In a case where it is not "0" (Step S11: NO), the process goes to Step S12. In a case where it is "0" (Step S11: YES), the process goes to Step S14.

In Step S12, the control unit 11 judges whether or not the relay node identifier (any but 0) added to the addressed node information of the message is registered in the relay node table. In a case where it is not registered (Step S12: NO), the process returns to Step S1. In a case where it is registered (Step S12: YES), the process goes to Step S13.

In Step S13, the control unit 11 rewrites the addressed node information of the message to the node information of the NAT untraversal node registered in the relay node table, adds the relay node identifier "0", and transmits (transfers) the message to the NAT untraversal node. Then the process returns to Step S1.

In a various messages receiving process of Step S14, as shown in FIG. 9, the control unit 11 judges whether or not thus received message is a search message (Step S141). In a case where thus received message is the search message (Step S141: YES), the process goes to Step S142. In a case where it is not the search message (Step S141: NO), the process goes to Step S146.

In Step S142, the control unit 11 judges from an index cache whether or not the index information related to the content retention node storing content data corresponding to the content ID, included in the search message, is registered. In a case where the index information is registered (Step S142: YES), the control unit 11 acquires the index information. Then the process goes to Step S143. In a case where the index information is not registered (Step S142: NO), the process goes to Step S144.

In Step S143, the control unit 11 identifies the content retention node based on the acquired index information, and transmits (transfers) the search message to the content retention node. Then the process goes to Step S144.

In Step S144, the control unit 11 judges whether or not the content data corresponding to the content ID included in the search message is stored in a memory unit 12 in the own node. In a case where it is stored (Step S144: YES), the process goes to Step S145. In a case where it is not stored (Step S144: NO), the process returns to that of FIG. 8.

In Step S145, the control unit 11 transmits a search response message to the node Nn corresponding to the sending source node information included in the search message. Then the process returns to the process of FIG. 8.

In Step S146, the control unit 11 judges whether or not the received message is a search response message. In a case where the received message is a search response message (Step S146: YES), the process goes to Step S147, and in a case where the received message is not a search response message (Step S146: NO), the process goes to Step S148.

In Step S147, the control unit 11 transmits the content transmit request message to the content retention node corresponding to the sending source node information in the search response message and the process returns to the process of FIG. 8.

In Step S148, the control unit 11 judges whether or not the received message is a content transmit request message. In a case where the received message is the content transmit request message (Step S148: YES), the process goes to Step S149. In a case where the received message is not the content transmit request message (Step S148: NO), the process goes to Step S152.

In Step S149, the control unit 11 judges whether or not content data related to the content transmit request is currently deliverable. In a case where it is deliverable (Step S149: YES), the process goes to Step S150, and in a case where it is not deliverable (Step S149: NO), the process goes to Step S151.

In Step S150, as mentioned above, the control unit 11 transmits the content transmit message stored in the content data to the user node corresponding to the sending source node information included in the content transmit request message, and the process returns to the process of FIG. 8.

In Step S151, the control unit 11 transmits the content untransmittable message to the user node corresponding to the sending source node information included in the content transmit request message. Then the process returns to the process of FIG. 8.

In Step S152, the control unit 11 judges whether or not the received message is the content transmit message. In a case where it is the content transmit message (Step S152: YES), the process goes to Step S153. In a case where it is not the content transmit message (Step S152: NO), the process goes to Step S154.

In Step S153, the control unit 11 memorizes and stores the content data included in the content transmit message in a memory unit 11, and upon the completion the control unit 11 transmits a publish message including content ID and the like of the content data to the root node. Then the process returns to the process of FIG. 8.

In Step S154, the control unit 11 judges whether or not the received message is the content untransmittable message. In a case where it is the content untransmittable message (Step S154: YES), the process goes to Step S155, and in a case where it is not the content untransmittable message (Step S154: NO), the process goes to Step S156.

In Step S155, the control unit 11 transmits the content transmit request message to the content management server managing all content data. Then the process returns to the process of FIG. 8.

In Step S156, the control unit 11 judges whether or not the received message is the publish message. In a case where it is the publish message (Step S156: YES), the process goes to Step S157. In a case where it is not the publish message (Step S156: NO), the process returns to the process of FIG. 8.

In Step S157, the control unit 11 newly registers (memorizes in the index cache region) the content ID included in the received publish message, the sending source node information, and the index information including the relay node identifier added to this. Then the process returns to the process of FIG. 8.

In sending of respective messages in FIGS. 8 and 9 (Steps S3, S10, S13, S143, S145, S147, S150, S151, and S153), the processes shown in FIG. 10 are carried out.

In FIG. 10, the control unit 11 judges whether or not message sending is succeeded (Step S21). In a case where it is succeeded (message being enable to be sent) (Step S21: YES), the process is finished. In a case where it is not succeeded (Step S21: NO), the process goes to Step S22.

In Step S22, the control unit 11 judges whether or not the addressed node information where the message cannot be sent is registered in the relay node table. In a case where it is registered (Step S22: YES), the process goes to Step S23. In a case where it is not registered (Step S22: NO), the process goes to Step S24.

In Step S23, the control unit 11 deletes the addressed node information and the relay node identifier from the relay node table, further deletes session information related to a socket with the addressed node Nn from the socket table, and disconnects the session (socket disconnection). Then the process goes to Step S24.

In Step S24, the control unit 11 judges whether or not the addressed node information where the message cannot be sent is registered in the routing table using DHT. In a case where it is not registered (Step S24: NO), the process is finished. In a case where it is registered (Step S24: YES), the addressed node information is deleted from the routing table (Step S25). Then the process is finished.

As explained above, according to the above embodiment, when the relay node being a message of an NAT untraversal node as a sending source receives a message addressed to the other node Nn but the own node, the relay node rewrites the sending source node information included in the message to the own node information, and adds a relay node identifier indicating an NAT untraversal node to the message and transmits the message to the addressed node Nn. Further, when the relay node receives a message of the other sending source nodes Nn but the NAT untraversal nodes, it judges whether or not the message is a message to be sent to the NAT untraversal node based on the relay node identifier added to the addressed node information included in the message. In a case where it is a message to be sent to the NAT untraversal node, the message is sent (transferred) to the NAT untraversal node. According to the configuration, even if the NAT untraversal node participates in a distributed content storing system S, users of each node Nn can appropriately receive delivery service of content data provided on the system S. Further, resending sources can be utilized without waste because NAT untraversal node is accessible from a side of network 8 through the relay node.

Further, since one relay node is not limited for one NAT untraversal node, but a plurality of relay nodes can be provided to one NAT untraversal node, many relay nodes can be evenly utilized thereby securing plural communication paths to reduce load of the relay node. It is possible that a relay node is made of arbitrary node Nn establishing new session by starting session from NAT untraversal node.

Further, efficiency can be improved by such a configuration that one content data is divided into plurality of predetermined amount, each of thus divided content data is distributed and stored in plural nodes Nn, and thus divided content data are sequentially downloaded.

4. MODIFIED EXAMPLE

Next, a modified example of the above embodiment will be explained.

In this modified example, the relay node table of the above-mentioned relay node is unnecessary. Further, the relay node identifier is also unnecessary. However, the network address information (i.e. IP address and port number except for node ID) included in node information which is a connection destination (i.e. NAT untraversal node) in session information related to session with the NAT untraversal node registered in a socket table of the relay node is replaced with network address information of the relay node. Since a basic configuration and function of the node Nn in the modifier is similar to the above-mentioned embodiment, overlapping explanation is omitted.

Figure 11:
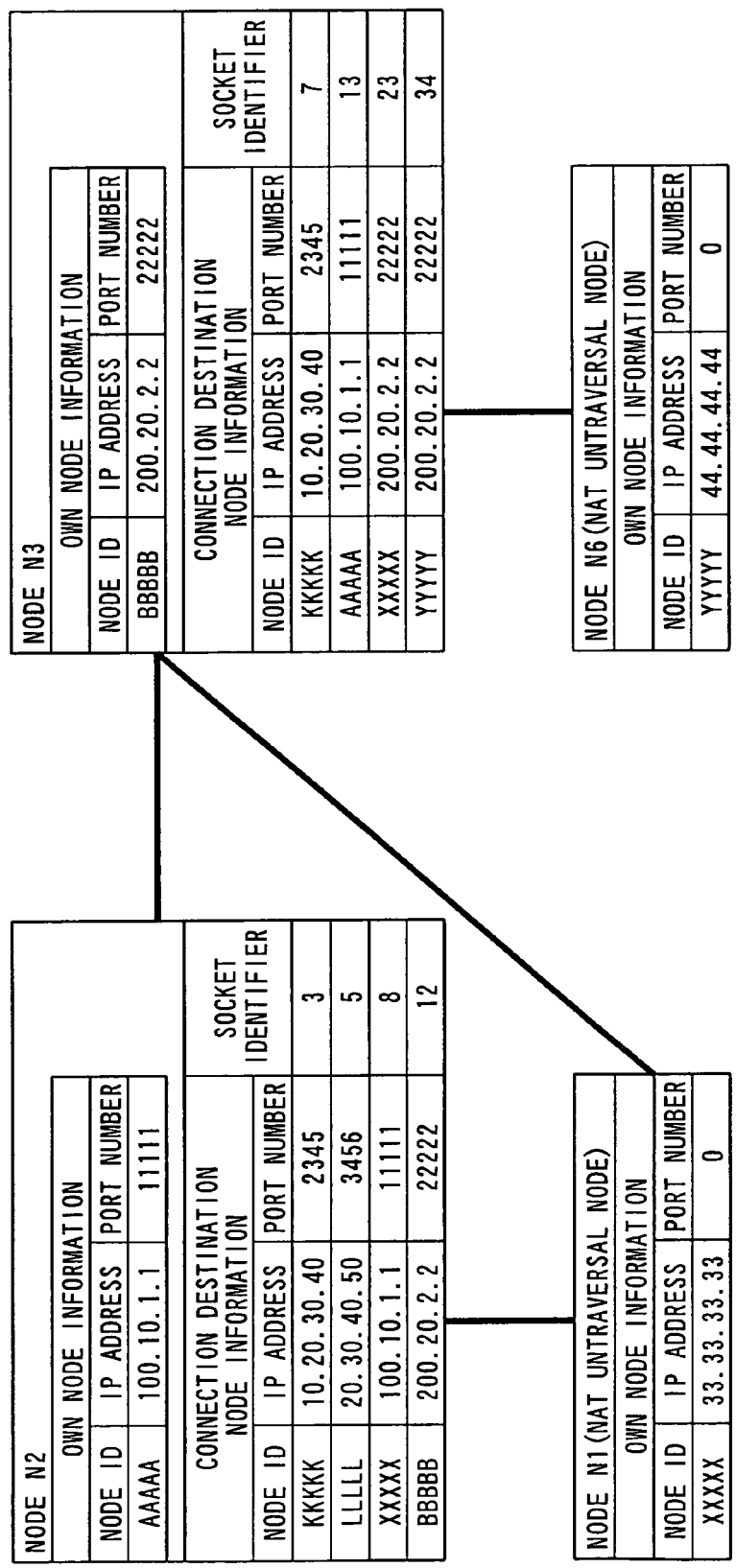
FIG. 11 is a view showing an example of a content of a socket table of a relay node of a modifier example.

FIG. 11 is a view showing an example of content of socket table in the relay node of the modifier. In the example of FIG. 11, since a node N1 is an NAT untraversal node among nodes Nn registered with node information in a socket table in a node N2, network address information included in the node information of the node N1 is replaced with network address information of the node N2. Further, since nodes N1 and N6 are NAT untraversal nodes among nodes Nn registered with node information in a socket table in a node N3, network address information included in the node information of the nodes N1 and N6 is replaced with network address information of the node N3.

Thus replaced IP address and port number of the NAT untraversal node are related to node ID and socket identifier and memorized.

Then, when a message sent from NAT untraversal node as a sending source being also a message addressed to the node Nn except for the own node is received, a control unit 11 of the relay node rewrite the sending source network address information included in the message to network address information of the own node (not rewriting node ID) and transmits the message to an addressed node Nn. On the other hand, when a message is received from a node Nn except for the NAT untraversal node as a sending source, the control unit 11 of the relay node judges whether or not the message is a message to be sent to an NAT untraversal node based on an addressed node ID included in the message. Then in a case where it is the message to be sent to the NAT untraversal node, the control unit 11 controls to transmit the message to the NAT untraversal node. For example, in a case where node ID included in the addressed node information of the message is an NAT untraversal node, thus received message is sent to the NAT untraversal node through the socket.

Hereinafter, processes in the control unit 11 of the node Nn in the modifier example will be described with reference to FIGS. 12 to 14.

Figure 12:
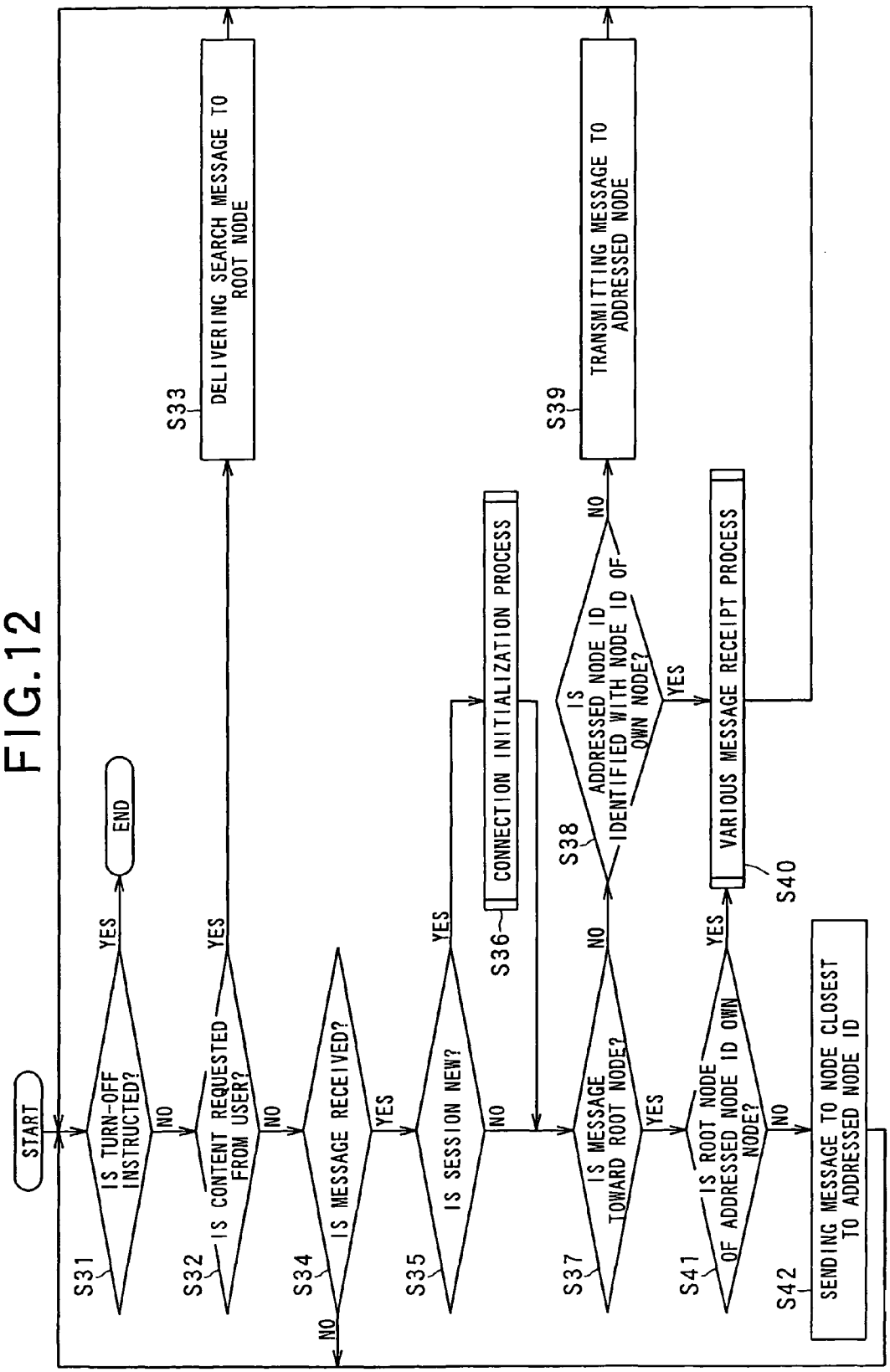
FIG. 12 is a flowchart showing an example of process in a control unit 11 of a node Nn of a modifier example.
Figure 13:
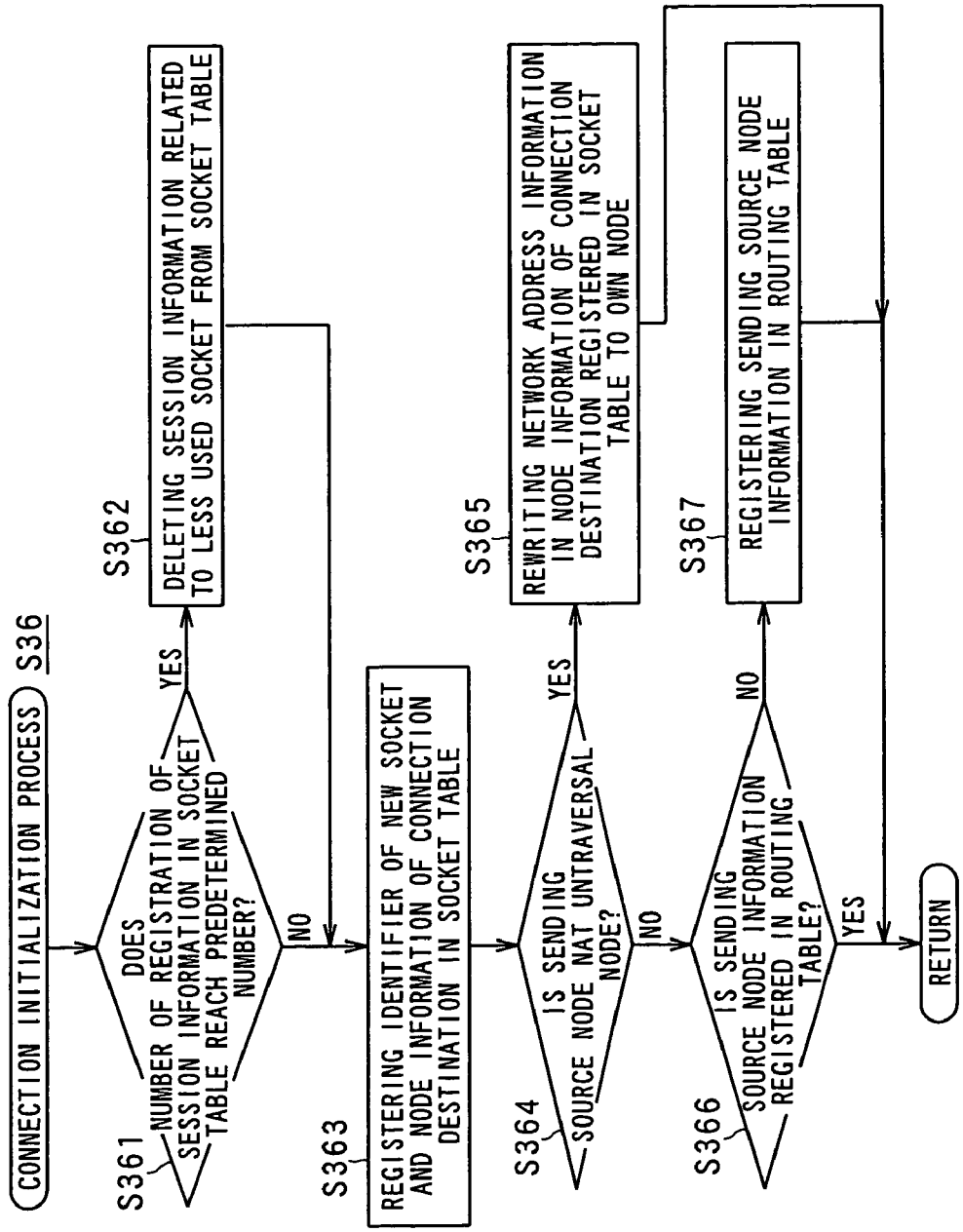
FIG. 13 is a flowchart showing an example of process in a control unit 11 of a node Nn of a modifier example.

FIGS. 12 to 14 are flowcharts showing an example of process in the control unit 11 of the node Nn in the modifier example. Here, the processes of Steps S31 to S33 in FIG. 12 are similar to those of Steps S1 to S3.

In Step S34, the control unit 11 judges whether or not a message is received from another node Nn. In a case where the message is received (Step S34: YES), the process goes to Step S35. In a case where the message is not received (Step S34: NO), the process returns to Step S31.

In Step S35, the control unit 11 judges whether or not the session is a new session (inclusive of reconnection case) from, for example, a socket table. In a case where it is a new session (Step S35: YES), the process goes to Step S36. In a case where it is not a new session (Step S35: NO), the process goes to Step S37.

In a connection initialization process in Step S36, as shown in FIG. 13, the control unit 11 judges whether or not the number of registration of the session information in the socket table reaches the predetermined number (e.g. upper limit) (Step S361). In a case where it reaches (Step S361: YES), the process goes to Step S362. In a case where it does not reach (Step S361: NO), the process goes to Step S363.

In Step S362, the control unit 11 deletes session information related to, for example, the less used socket from the socket table and disconnects the session (socket disconnection), and the process goes to Step S363.

In Step S363, the control unit 11 exchanges mutual node information and registers an identifier of the new socket and node information of connection destination (communication party) in the socket table, and the process goes to Step S343.

In Step S364, the control unit 11 judges whether or not node Nn of a sending source of the message thus received is an NAT untraversal node. In a case where it is an NAT untraversal node (Step S364: YES), the process goes to Step S365. In a case where it is not an NAT untraversal node (Step S364: NO), the process goes to Step S366.

In Step S365, the control unit 11 replaces network address information in node information of the connection destination registered in the socket table (i.e. IP address and port number) with network address information of the own node. Further, the control unit 11 rewrites network address information of a sending source of the received message to network address information of the own node.

In Step S366, the control unit 11 judges whether or not sending source node information of thus received message is registered in the own routing table using DHT. In a case where it is registered (Step S366: YES), the process is finished, and in a case where it is not registered (Step S366: NO), the process goes to Step S367.

In Step S367, the control unit 11 registers the sending source node information in the routing table, and the process returns to the process of FIG. 12.

Here, on the completion of the above-mentioned process of Step 365, the process may go to Step S367. That is, the node information of the NAT untraversal node where the network address information is rewritten to the own node is registered in the routing table using DHT. Thus, the number of nodes Nn caching index information can be increased.

The process returns to Step S37 of FIG. 12, the control unit 11 judges whether or not the received message is toward the root node (e.g. judging by information indicative of "toward root node" attached to the message). In a case where it is not toward the root node (Step S37: NO), the process goes to Step S38, and in a case where it is toward the root node (Step S37: YES), the process goes to Step S41.

In Step S38, the control unit 11 judges whether or not the node ID included in the message addressed node information matches the node ID of the own node. In a case where it does not match (Step S38: NO), the process goes to Step S39, and in a case where it matches (Step S38: YES), the process goes to Step S40.

In Step S39, the control unit 11 transmits (transfers) the message toward the addressed node Nn. Here, this sending process is described later using FIG. 14.

In Step S40, a process of receiving various messages is carried out. This process is similar to the process described in the above-mentioned FIG. 9.

In Step S41, the control unit 11 judges whether or not the root node of the node ID included in the node information addressed by the received message is the own node (similar to the above-mentioned Step S9). In a case where it is the own node (Step S41: YES), the process goes to Step S40, and in a case where it is not the own node (Step S41: NO), the process goes to Step S42.

The process of Step S42 is similar to the above-mentioned process of Step S10.

Here, detail description of a process of transmitting a message is described using FIG. 14.

A process shown in FIG. 14 is carried out when the message is sent (transferred) in the above-mentioned process. Sending source and addressed node information of a message to be sent are already set.

In Step S51 in FIG. 14, the control unit 11 judges whether or not the same node ID as the node ID included in the node information addressed by the message to be sent is registered in the socket table. In a case where it is registered (Step S51: YES), the process goes to Step S52, and in a case where it is not registered (Step S51: NO), the process goes to Step S53.

In Step S52, the control unit 11 transmits the message to the node Nn corresponding to the node ID through the socket, and the process goes to Step S56.

For example, in a case where the node ID included in the node information addressed by the message to be sent by the node N2 is "XXXXX", the node ID "XXXXX" is registered in the socket table of the node N2 as shown in FIG. 11. Therefore, the message is sent to the node N1 (NAT untraversal node) using the socket of the node ID "XXXXX".

In Step S53, the control unit 11 judges whether or not the same network address information as the network address information included in the node information addressed by the message to be sent is registered in the socket table. In a case where the network address information is registered (Step S53: YES), the process goes to Step S52, and in a case where it is not registered (Step S53: NO), the process goes to Step S54.

For example, in a case where the node ID included in the node information addressed by the message to be sent by the node N2 is "YYYYY", and the network address information is "200.20.2.2", the node ID "YYYYY" is not registered in the socket table of the node N2, but the network address information "200.20.2.2" is registered as shown in FIG. 11. Therefore, the network address information is used and the message is sent to the node N3 corresponding to this. Since in the node N3, the node ID "YYYYY" is registered in the socket table as shown in FIG. 11, the socket of the node ID "YYYYY" is used and the message is sent to the node N6 (NAT untraversal node). That is, the node N2 is relayed the message by the node N3 and sent to the node N6.

On the other hand in Step S54, the control unit 11 starts session using the network address information included in the node information addressed by the message to be sent. In a case where the session is established, the process goes to Step S52 after a process of initializing connection as shown in Step S55 is carried out. Here, the process of initializing connection is similar to the process shown in the above-mentioned FIG. 13.

Next, in Step S56, the control unit 11 judges whether or not the message sending is succeeded. In a case where it is succeeded (Step S56: YES), the process is finished, and in a case where it is not succeeded (Step S56: NO), the process goes to Step S57.

In Step S57, the control unit 11 deletes the session information related to the socket with the addressed node Nn where the message cannot be sent from the socket table, the session is disconnected. Then the process goes to Step S58.

In Step S58, the control unit 11 judges whether or not the addressed node information is registered in the routing table using DHT. In a case where it is not registered (Step S58: NO), the process is finished, and in a case where it is registered (Step S58: YES), the addressed node information is deleted from the routing table (Step S59). Then the process is finished.

As described above, according the above-mentioned modifier, when the relay node receives a message sent from the NAT untraversal node as a sending source being also a message addressed to the node Nn except for the own node, the relay node rewrites only network address information included in the sending source node information include in the message to network address information of the own node (not rewriting node ID) and transmits the message to the addressed node Nn. Further, when the message sent by the node Nn except for the NAT untraversal node as a sending source is received, it is judged whether or not the message is a message to be sent to the NAT untraversal node based on the addressed node ID included in the message. In a case where it is a message to be sent to the NAT untraversal node, the message is sent (transferred) to the NAT untraversal node. Therefore, in such a configuration, even if an NAT untraversal node participates in a distributed content storage system S, a relay node table and a relay node identifier are not necessary, thereby improving efficiency more than previously described embodiment and enables users of respective nodes Nn to appropriately receive services such as content data delivery which are provided on the system S.

Meanwhile, with regard to the above configuration, when the relay node receives a message which is sent from the NAT untraversal node as a sending source and also is addressed to nodes Nn except for the own node, the relay node rewrites at least sending source network address information included in the message to network address information of the own node and transmits the message to the addressed node Nn. It may be configured, for example, that network address information of the own node as a sending source is added without rewriting the sending source network address information, and the message is sent to another node Nn. That is, it meets the requirement that another node Nn receiving the message can confirm that the relay node is a sending source, and the relay node can judge whether or not the received message a message to be sent to the NAT untraversal node.

Here, the explanation is given on a premise that the distributed content storing system S of the above-mentioned embodiment is configured by the algorithm using DHT. However, the present invention is not limited thereto.

The present invention is not confined to the configurations listed in the foregoing embodiments, but it is easily understood that the person skilled in the art can modify such configurations into various other modes, within the scope of the present invention described in the claims.

What is claimed is:

1. A relay node device in a communication system, the communication system including a plurality of node devices, the plurality of node devices being connected to a network, wherein
    the plurality of the node devices include the relay node device, the relay node device being connected to the network, and
    the plurality of node devices include a first node device, the first node device being connected to the network through a relay device, the relay device preventing acceptance of session start from the network side, the relay node device comprising:
        a session retention unit that establishes and retains session with the first node device, the first node device being not able to accept session start through the relay device from the network side;
        a receiving unit that receives a message sent from any of the plurality of node devices;
        a first determining unit that determines whether a sending source of the message received by the receiving unit is the first node device;
        a converting unit that converts first network address information indicating a network address of the first node device into second network address information indicating a network address of the relay node device in response to determining that the sending source of the message is the first node device by the first determining unit, and the first address information is included in the message received by the receiving unit;
        a sending control unit that controls sending of the message converted by the converting unit to any of the plurality of node devices, and
        a second determining unit that determines whether the received message is to be sent to the first node device based on the relay information included in the received message, in response to receiving a message whose sending source is a node device of the plurality of node devices and is different from the first node device;
        wherein the sending control unit controls sending of the message to the first node device, in response to determining the received message is to be sent to the first node device, and
        wherein the converting unit converts the first network address information into the second network address information and adds relay information indicative of the first node device to the message converted by the converting unit, in response to receiving the message from the first node device by the receiving unit.

2. The relay node device according to claim 1, the relay node device further comprises:
    a storing unit that stores the first network address information of the first node device;
    wherein the session retention unit retains the session, in response to the establishment of the session from the first node device.

3. The relay node device according to claim 1,
    wherein the first determining unit that determines whether the sending source of the message received by the receiving unit is the first node device and a destination of the received message is other than the relay node device which received the message; and
    the converting unit that converts the first network address information into the second network address information, in response to determining that the sending source of the message is the first node device by the first determining unit and the destination of the received message is other than the relay node device which received the message.

4. The relay node device according to claim 1, wherein the relay node device is any one of the plurality of the node devices connected through an overlay network comprising the plurality of node devices.

5. The relay node device according to claim 1, wherein the relay node device further comprises:
    a controller configured to execute instructions of software engine, the software engine comprising: the session retention unit; the first determining unit; the converting unit; and the sending control unit.

6. The relay node device according to claim 1,
    wherein the sending control unit controls sending of the converted message which is added to the relay information and transmits the added message to any of the plurality of node devices,
    the relay node device further comprises:
    a memorizing unit that memorizes the relay information and the first network address information corresponding to each other,
    wherein the sending control unit controls sending of the message to the first node device using the first network address information corresponding to the relay information included in the received message in the memorizing unit, in response to determining that the received message is to be sent to the first node device by the second determining unit.

7. The relay node device according to claim 1,
    the plurality of the node devices are assigned node identifying information which identifies the plurality of the node devices;
    wherein the message includes the node identifying information of the sending source, sending source network address information indicative of a network address of the sending source, the node identifying information of a destination of the message which is sent by the sending source, and destination network address information indicative of a network address of the destination,
    the relay node device further comprises:
    a memorizing unit that memorizes the node identifying information of the sending source which is the first node device, and the node identifying information is memorized in the memorizing unit corresponding to the first network address information,
    wherein the sending control unit controls transmitting of the message to the destination, and
    the sending control unit controls to sending of the message to the first node device using the first network address information corresponding to the node identifying information included in the received message in the memorizing unit, in response to determining that the received message is to be sent to the first node device by the second determining unit.

8. A non-transitory computer-readable storage medium that stores a computer-executable program for a relay node device in a communication system, the communication system including a plurality of node devices, the plurality of node devices being connected to a network, the plurality of the node devices including the relay node device, the relay node device being connected to the network, and the plurality of node devices including a first node device, the first node device being connected the network through a relay device, the relay device preventing acceptance of session start from the network side, the program being stored in the relay node device, the computer-executable program comprising instructions for:

establishing and retaining session with the first node device, the first node device being not able to accept session start through the relay device from the network side;

receiving a message sent from any one of the plurality of node devices, receiving the message being performed by a receiving unit;

determining whether a sending source of the message received by the receiving unit is the first node device, determining the sending source of the message being performed by a first determining unit;

converting first network address information indicating a network address of the first node device into second network address information indicating a network address of the relay node device in response to determining that the sending source of the message is the first node device by the first determining unit, and the first address information is included in the message received by the receiving unit, converting the first network address information being performed by a converting unit; and sending the message converted by the converting unit to any one of the plurality of node devices, sending the message being controlled by a sending control unit;

determining whether the received message is to be sent to the first node device based on the relay information included in the received message, in response to receiving a message whose sending source is a node device of the plurality of node devices and is different from the first node device, determining whether to sent the received message being performed by a second determining unit;

controlling sending of the message to the first node device, in response to determining the received message is to be sent to the first node device, controlling the sending of the message being performed by the sending control unit, and converting the first network address information into the second network address information and adds relay information indicative of the first node device to the message converted by the converting unit, in response to receiving the message from the first node device by the receiving unit, converting the first network address information being performed by the converting unit.

9. A communication system including a plurality of node devices including a relay node device, the plurality of node devices being connected to a network, the plurality of the node devices including the relay node device, the relay node device being connected to the network, and the plurality of node devices including a first node device, the first node device being connected the network through a relay device, the relay device preventing acceptance of session start from the network side, the relay node device comprising:

a session retention unit that establishes and retains session with the first node device, the first node device being not able to accept session start through the relay device from the network side;

a receiving unit that receives a message sent from any one of the plurality of node devices;

a first determining unit that determines whether a sending source of the message received by the receiving unit is the first node device;

a converting unit that converts first network address information indicating a network address of the first node device into second address information indicating a network address of the relay node device in response to determining that the sending source of the message is the first node device by the first determining unit, and the first address information is included in the message received by the receiving unit; and a sending control unit that controls sending of the message converted by the converting unit to any one of the plurality of node devices;

a second determining unit that determines whether the received message is to be sent to the first node device based on the relay information included in the received message, in response to receiving a message whose sending source is a node device of the plurality of node devices and is different from the first node device;

wherein the sending control unit controls sending of the message to the first node device, in response to determining the received message is to be sent to the first node device, and wherein the converting unit converts the first network address information into the second network address information and adds relay information indicative of the first node device to the message converted by the converting unit, in response to receiving the message from the first node device by the receiving unit.

10. A message transmitting and receiving method in a communication system including a plurality of node devices includes, the plurality of node devices being connected to a network, the plurality of the node devices including a relay node device, the relay node device being connected to the network, and the plurality of node devices including a first node device, the first node device being connected the network through a relay device, the relay device preventing acceptance of session start from a network side, comprising steps carried out by the relay node device:

establishing and retaining session with the first node device, the first node device being not able to accept session start through the relay device from the network side; and receiving a message sent from any one of the plurality of node devices, receiving the message being performed by a receiving unit;

determining whether a sending source of the message received by the receiving unit is the first node device, determining the sending source of the message being performed by a first determining unit;

converting first network address information indicating a network address of the first node device into second network address information indicating a network address of the relay node device in response to determining that the sending source of the message is the first node device by the first determining unit, and the first address information is included in the message received by the receiving unit, converting the first network address information being performed by a converting unit, sending the message converted by the converting unit to any one of the plurality of node devices, sending the message being controlled by a sending control unit;

determining whether the received message is to be sent to the first node device based on the relay information included in the received message, in response to receiving a message whose sending source is a node device of the plurality of node devices and is different from the first node device, determining whether to sent the received message being performed by a second determining unit;

controlling sending of the message to the first node device, in response to determining the received message is to be sent to the first node device, controlling the sending of the message being performed by the sending control unit, and converting the first network address information into the second network address information and adds relay information indicative of the first node device to the message converted by the converting unit, in response to receiving the message from the first node device by the receiving unit, converting the first network address information being performed by the converting unit.

* * * * *